US012360265B2

(12) United States Patent
Penny et al.

(10) Patent No.: US 12,360,265 B2
(45) Date of Patent: Jul. 15, 2025

(54) CHARGED PARTICLE SCANNERS

(71) Applicant: Decision Sciences International Corporation, Poway, CA (US)

(72) Inventors: Robert D. Penny, San Diego, CA (US); Michael James Sossong, Ramona, CA (US); Matthew Steiger, El Cajon, CA (US); Young K. Lee, San Diego, CA (US)

(73) Assignee: Decision Sciences International Corporation, Poway, CA (US)

( * ) Notice: Subject to any disclaimer, the term of this patent is extended or adjusted under 35 U.S.C. 154(b) by 438 days.

(21) Appl. No.: 17/986,349

(22) Filed: Nov. 14, 2022

(65) Prior Publication Data

US 2023/0161059 A1    May 25, 2023

Related U.S. Application Data

(62) Division of application No. 16/853,520, filed on Apr. 20, 2020, now Pat. No. 11,614,552.

(60) Provisional application No. 62/836,004, filed on Apr. 18, 2019.

(51) Int. Cl.
| | |
|---|---|
| *G01T 5/08* | (2006.01) |
| *H05H 7/00* | (2006.01) |
| *H05H 7/04* | (2006.01) |
| *H05H 13/00* | (2006.01) |

(52) U.S. Cl.
CPC .............. *G01T 5/08* (2013.01); *H05H 7/001* (2013.01); *H05H 7/04* (2013.01); *H05H 13/00* (2013.01); *H05H 2007/002* (2013.01); *H05H 2007/045* (2013.01); *H05H 2277/1405* (2013.01)

(58) Field of Classification Search
CPC .. G01T 5/08; H05H 7/001; H05H 7/04; H05H 13/00; H05H 2007/002; H05H 2007/045; H05H 2277/1405
See application file for complete search history.

(56) References Cited

U.S. PATENT DOCUMENTS

| | | |
|---|---|---|
| 5,148,025 A | 9/1992 | Ahn |
| 6,486,481 B1 | 11/2002 | Tigera |
| 6,555,818 B1 | 4/2003 | Hosokawa |
| 8,109,865 B2 | 2/2012 | Jackson |
| 9,880,301 B2 | 1/2018 | Schulte |
| 10,215,717 B2 | 2/2019 | Kurnadi |
| 10,231,679 B2 | 3/2019 | Worstell |
| 10,249,063 B2 | 4/2019 | Allinson |
| 10,371,855 B2 | 8/2019 | Catalano |
| 10,416,341 B2 | 9/2019 | Gallagher |
| 10,555,709 B2 | 2/2020 | Sossong |
| 10,561,377 B2 | 2/2020 | Sossong |

(Continued)

Primary Examiner — Nicole M Ippolito
(74) Attorney, Agent, or Firm — Perkins Coie LLP

(57) ABSTRACT

A volume interrogation system can use an accelerated beam of charged particles to interrogate objects using charged-particle attenuation and scattering tomography to screen items such as portable electronic devices, packages, baggage, industrial products, or food products for the presence of materials of interest inside. The exemplary systems and methods in this patent document can be employed in checkpoint applications to scan items. Such checkpoint applications can include border crossings, mass transit terminals (subways, buses, railways, ferries, etc.), and government and private-sector facilities.

18 Claims, 32 Drawing Sheets

(56) References Cited

U.S. PATENT DOCUMENTS

| | | |
|---|---|---|
| 10,613,247 B2 | 4/2020 | Kang et al. |
| 10,884,141 B2 | 1/2021 | Nelson |
| 10,918,888 B2 | 2/2021 | Ramezanzadeh |
| 11,116,459 B2 | 9/2021 | Dejongh |
| 11,152,190 B2 | 10/2021 | Penny et al. |
| 11,215,536 B2 | 1/2022 | Thaler |
| 2008/0160431 A1* | 7/2008 | Scott .................. H10D 30/0221 257/E21.241 |
| 2012/0160999 A1 | 6/2012 | Zaluzec |
| 2015/0245802 A1 | 9/2015 | Sossong |
| 2016/0116605 A1 | 4/2016 | Frisch |
| 2016/0178769 A1 | 6/2016 | Schulte |
| 2016/0260578 A1 | 9/2016 | Sossong |
| 2019/0378682 A1 | 12/2019 | Wang |
| 2020/0035452 A1* | 1/2020 | Bennahmias ........... H01J 37/04 |
| 2020/0333482 A1 | 10/2020 | Penny et al. |
| 2020/0335299 A1 | 10/2020 | Penny |
| 2021/0003735 A1 | 1/2021 | Georgadze et al. |

* cited by examiner

US 12,360,265 B2

CHARGED PARTICLE SCANNERS

CROSS REFERENCE TO RELATED APPLICATIONS

The present application is a divisional of U.S. patent application Ser. No. 16/853,520, filed Apr. 20, 2020, which claims the benefit of priority to U.S. Provisional Patent Application No. 62/836,004, filed Apr. 18, 2019. The entire contents of the before-mentioned patent applications are incorporated by reference as part of the disclosure of this application.

FEDERALLY SPONSORED RESEARCH OR DEVELOPMENT

This invention was made with government support under Navy-15-C-3364 awarded by Combating Terrorism Technical Support Office (CTTSO). The government has certain rights in the invention.

TECHNICAL FIELD

This patent document relates to charged particle scanners for scanning various items.

BACKGROUND

Currently, scanning or screening technology is represented by single-energy or dual-energy X-ray imaging in two dimensions (2D). However, X-rays can have limited material discrimination capability because X-rays can measure only a single material property—the X-ray absorption coefficient. Thus, the use of X-ray technology can lead to either a high alert rate of possible threats or a low probability of detecting actual threats. The high alert rate causes a person to perform secondary inspection of many items, thus raising staffing requirements. And, the low probability of detecting actual threats means that some threats can pass through a checkpoint undetected, thus defeating a purpose of a security checkpoint.

SUMMARY

This patent document discloses apparatus, systems, and methods for detection of materials by measuring multiple coulomb scattering and attenuation of charged particles traversing a volume of interest (VOI). For example, an exemplary scanner for interrogating contents of a volume includes an accelerator structured to generate a beam of charged particles; a chamber located in a path of the beam of charged particles to receive the beam of charged particles; a beam steering system located in the chamber to receive the beam of charged particle and structured to scan the beam of charged particles over a range of beam angles; a translation stage located in a path of the scanned beam of charged particles from the beam steering system, the translation stage is configured to support an object to be scanned, and the translation stage is operable to move the object relative to the scanned beam of charged particles; a first particle tracking detector located relative to the translation stage to receive charged particles that transit through the object and to measure position and direction of the charged particles that transit through the object while allowing the charged particles to pass through; a calorimeter located relative to the first particle tracking detector to receive the charged particles from the first particle tracking detector and to measure the received charged particles to represent energy of the charged particles received by the first particle tracking detector; and a processor communicably coupled to the first particle tracking detector and the calorimeter to process information from the first particle tracking detector and the calorimeter to yield an estimate of a spatial map of atomic number and density of the object.

In some embodiments, the beam steering system comprises: a primary steering magnet structured to receive the beam of charged particles from the accelerator, wherein the primary steering magnet is enabled to laterally sweep the beam; two wedge magnets located relative to the primary steering magnet, the two wedge magnets structured to receive the laterally swept beam and to direct charged particles in a vertical trajectory so that the beam is rastered in position; and a secondary steering magnet located relative to the two wedge magnets, the secondary steering magnet structured to receive the rastered beam and to adjust angles of the charged particles that arrive at the object.

In some embodiments, the beam steering system further comprises: a bend magnet located in between the accelerator and primary steering magnet, where the bend magnet is structured to receive the charged particles from the accelerator, and where the bend magnet is structured to orient the charged particles toward the primary steering magnet. In some embodiments, the scanner further includes a collimator located between the bend magnet and the primary steering magnet, where the collimator is structured to receive the charged particles from the bend magnet and to direct the charged particles towards the primary steering magnet, and where the collimator is structured to absorb any stray charged particles.

In some embodiments, the beam steering system further comprises: one or more electromagnets enabled to provide trim fields to correct imperfections in a field of the two wedge magnets or to compensate for variations in beam energy. In some embodiments, the two wedge magnets are electro-magnets. In some embodiments, the first particle tracking detector comprises two or more layers of charged particle detectors with each layer being perpendicular to at least one other layer and each layer including a plurality of charged particle detectors parallel to each other and structured to convert deposited energy from at least some of the charged particles into electrical current. In some embodiments, the charged particle detectors comprise scintillating fibers coupled with silicon photomultiplier sensors.

In some embodiments, the scanner further includes a second particle tracking detector located relative to the translation stage and opposite to the first particle tracking detector, where the second particle tracking detector structured to receive and measure position and direction of the charged particles before the charged particles transit though the object while allowing the charged particles to pass through, and where the second particle tracking detector is communicably coupled to the processor to send information to the processor. In some embodiments, the second particle tracking detector comprises two or more layers of charged particle detectors with each layer being perpendicular to at least one other layer and each layer including a plurality of charged particle detectors parallel to each other and structured to convert deposited energy from at least some of the charged particles into electrical current. In some embodiments, the charged particle detectors comprise scintillating fibers coupled to silicon photomultiplier sensors.

In some embodiments, the calorimeter comprises: a first type of scintillator encased in a light box and structured to convert energy of the charged particles into optical photons and to stop the charged particles to minimize X-ray generation, wherein the light box includes an orifice that corresponds to an opening in the calorimeter to receive the charged particles; and one or more photomultiplier tubes coupled to the light box and structured to detect the optical photons. In some embodiments, the first type of scintillator comprises a single crystal stilbene. In some embodiments, the first type of scintillator is wrapped in an optical reflecting material. In some embodiments, the calorimeter further comprises: a second type of scintillator surrounding the first type of scintillator and encased in the light box, the second type of scintillator structured to convert energy of the charged particles into optical photons and to capture X-rays generated from the charged particles. In some embodiments, the second type of scintillator comprises lead tungstate. In some embodiments, the second type of scintillator is wrapped in an optical reflecting material. In some embodiments, the translation stage is a conveyor belt. In some embodiments, the charged particles include electrons.

An example method of operating a scanner for interrogating contents of a volume, the method comprising: generating a collimated charged particles beam; creating a rastered fan beam by steering the generated beam of charged particles through a range of angles; converting the rastered fan beam into a rastered parallel beam; steering the rastered parallel beam through a range of illumination angles to scan an object; detecting positions and directions of the charged particles that exit the object; and generating an estimate of a spatial map of the atomic number and the density of the object based on at least the positions and the directions of the charged particles that exit the object.

In some embodiments, the method further comprises moving an object to be scanned through the range of illumination angles of the steered rastered parallel beam. In some embodiments, the method further comprises determining scatter angles of the charged particles using at least the positions and the directions of the charged particles that exit the object, wherein the atomic number and the density of the object are proportional to the scatter angles. In some embodiments, the method further comprises detecting positions and directions of the charged particles beam before the charged particles beam enter the object, wherein the scatter angles are determined based on the positions of the charged particles beam before the charged particles beam enter the object and based on the positions of the charged particles that exit the object.

In some embodiments, the method further comprises measuring energy of the charged particles that exit the object; determining energy loss of the charged particles based on the measured energy and an energy of the charged particles beam that enter the object; and determining an estimate of the density of a part of the object along a path of the charged particles beam based on the energy loss, wherein the density of the part of the object is proportional to the energy loss.

DETAILED DESCRIPTION

This patent document discloses apparatus, systems, and methods for using a charged particle beam (e.g., beam of electrons) to interrogate a volume using charged particle attenuation and scattering tomography to screen the volume for the presence of materials of interest inside the volume. The disclosed apparatus, systems, and methods can improve three-dimensional (3D) mapping of materials within a volume by providing multiple illumination angles via controlled manipulation of the incident charged particle beam. The charged particle beam can be manipulated using, for example, suitable electronics and magnet geometries to provide multiple angles of illumination to improve the resolution of resulting 3D tomographic reconstructions of the interrogated volume.

There are several advantages of using direct-electron or other charged-particle beam tomography. For example, the scanner described in this patent document can enable better material discrimination, differentiate materials in a three-dimensional map of the volume, yield better throughput with more highly automated threat detection, automatically detect materials of interest based on material signature library agreement, lower false alarm rates, and enable checkpoint operation with lower staffing that further reduces operational cost. Thus, the disclosed scanners can be used at checkpoint applications, such as border crossings, mass transit terminals (subways, buses, railways, ferries, etc.), and government and private-sector facilities. Further, direct-electron tomography or other charged-particle beam tomography systems and methods use less expensive detector units with no moving parts that results in lower life-cycle costs compared to X-ray tomography, thanks to much lower maintenance and repair expenses.

Figure 1:
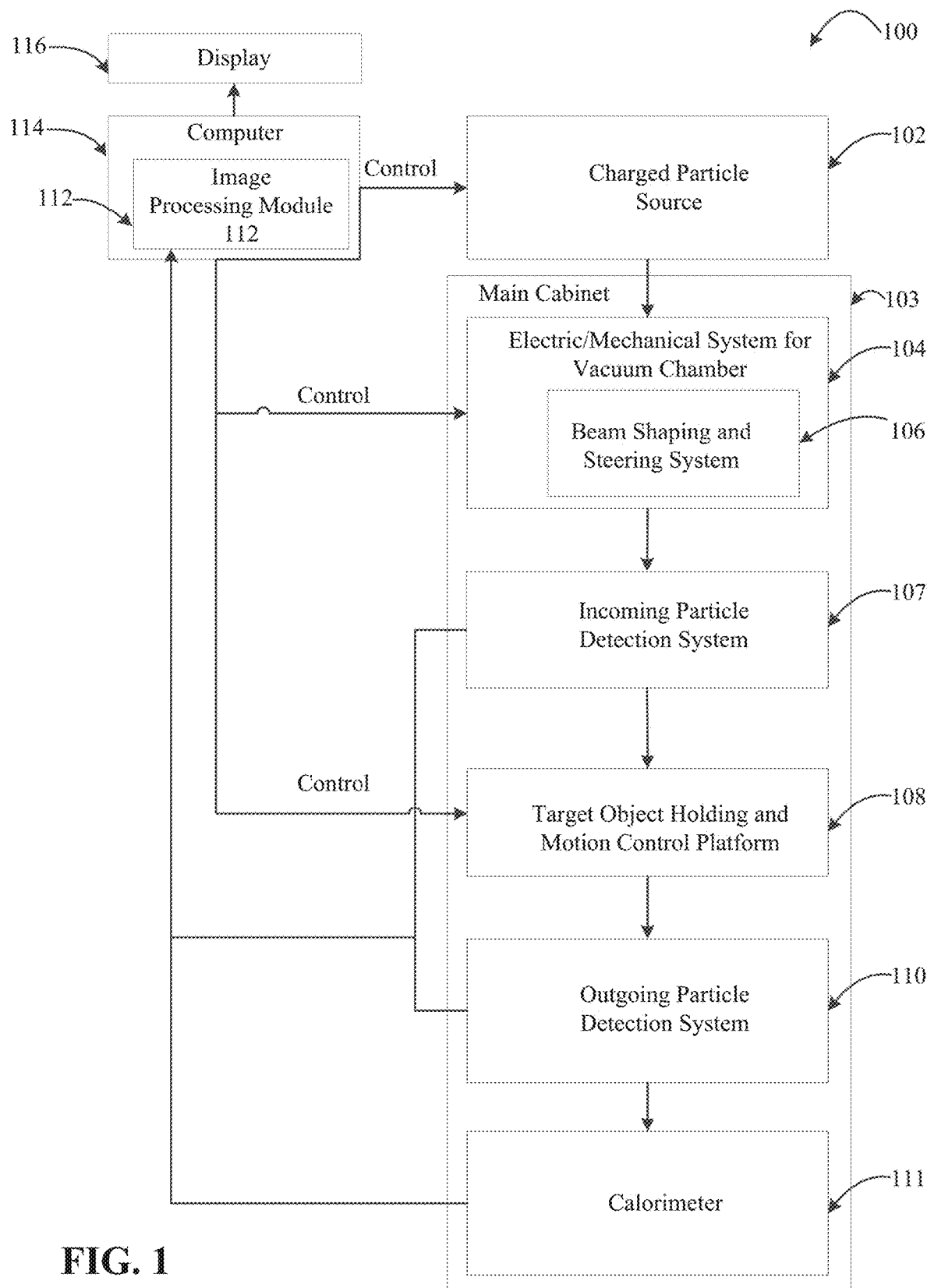
FIG. 1 illustrates an exemplary block diagram of the exemplary Portable-Electronics Scanner (PES).

FIG. 1 illustrates an exemplary Portable-Electronics Scanner (PES) 100 that includes a computer 114 that can control a charged particle beam source 102. The charged particle source 102 can generate a low dose of electrons that is accelerated to high energy and used as a probe of a volume of interest. A variety of accelerators can be adapted to fulfill the electron beam current and energy requirements for the charged particle source 102. The charged particle source 102 can include an accelerator, such as a microtron, that can produce electrons with a nominal energy chosen based on the average characteristics of the objects being scanned. For example, an accelerator can produce electrons with 10-50 MeV for items such as personal electronic devices.

The charged particle source 102 may generate a single collimated pencil beam of electrons (or other charged particles) having a pre-determined energy. Thus, the charged particle source 102 can generate a direct current (DC), pencil-beam of electrons at a high enough current to provide enough electrons to reconstruct a useable image of the device under inspection within an acceptable exposure time, but not so high a current to overwhelm the incoming and/or outgoing particle detection systems 107 and 110 (also known as incoming and/or outgoing particle tracking detectors). In some embodiments, a single charged particle source 102 can be configured or structured to deliver the beams of charged particles to one or more main cabinets 103.

Figure 10A:
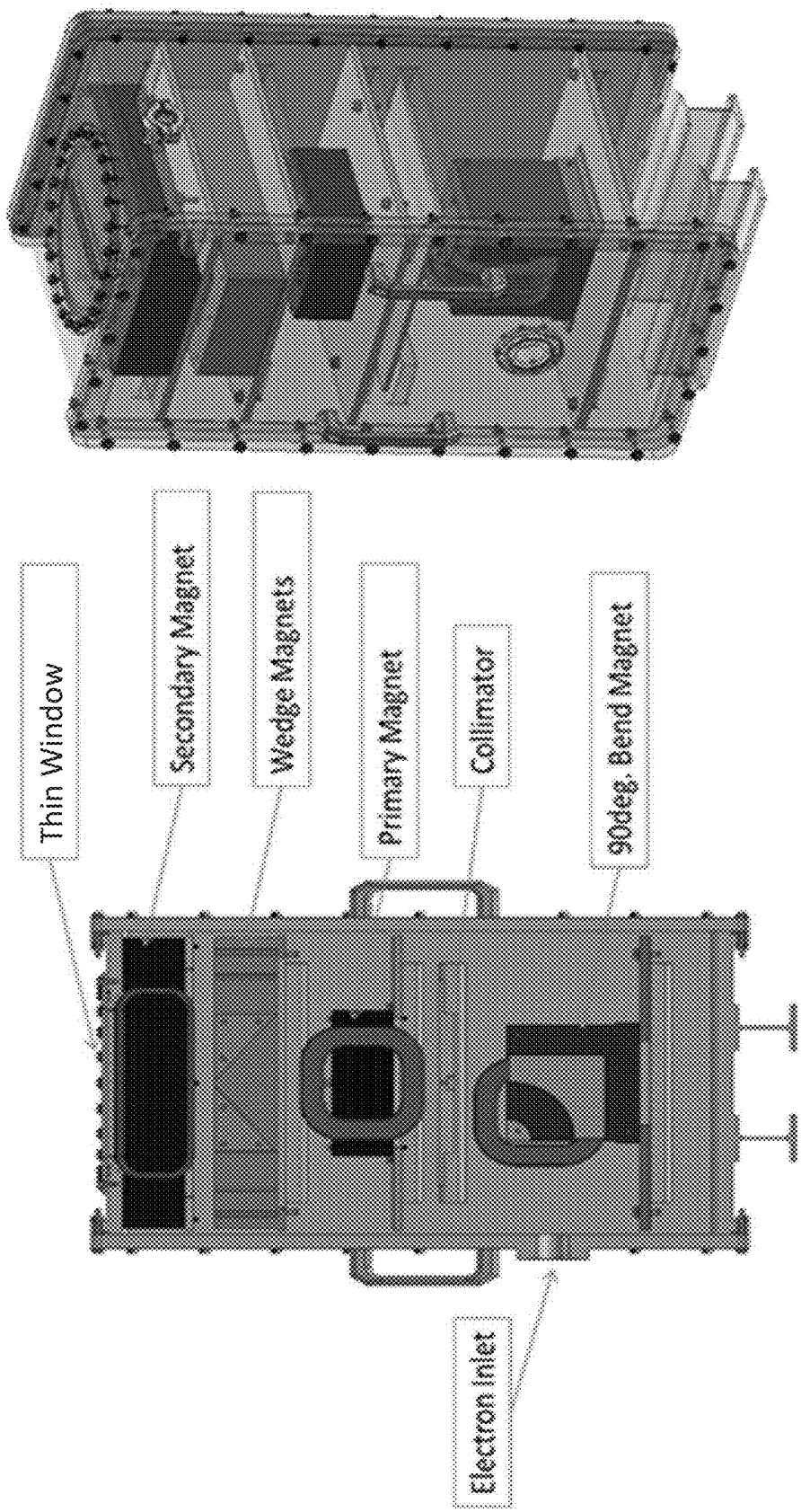
FIG. 10A illustrates a cut-away drawing of the exemplary vacuum system and beam shaping and steering system.
Figure 10B:
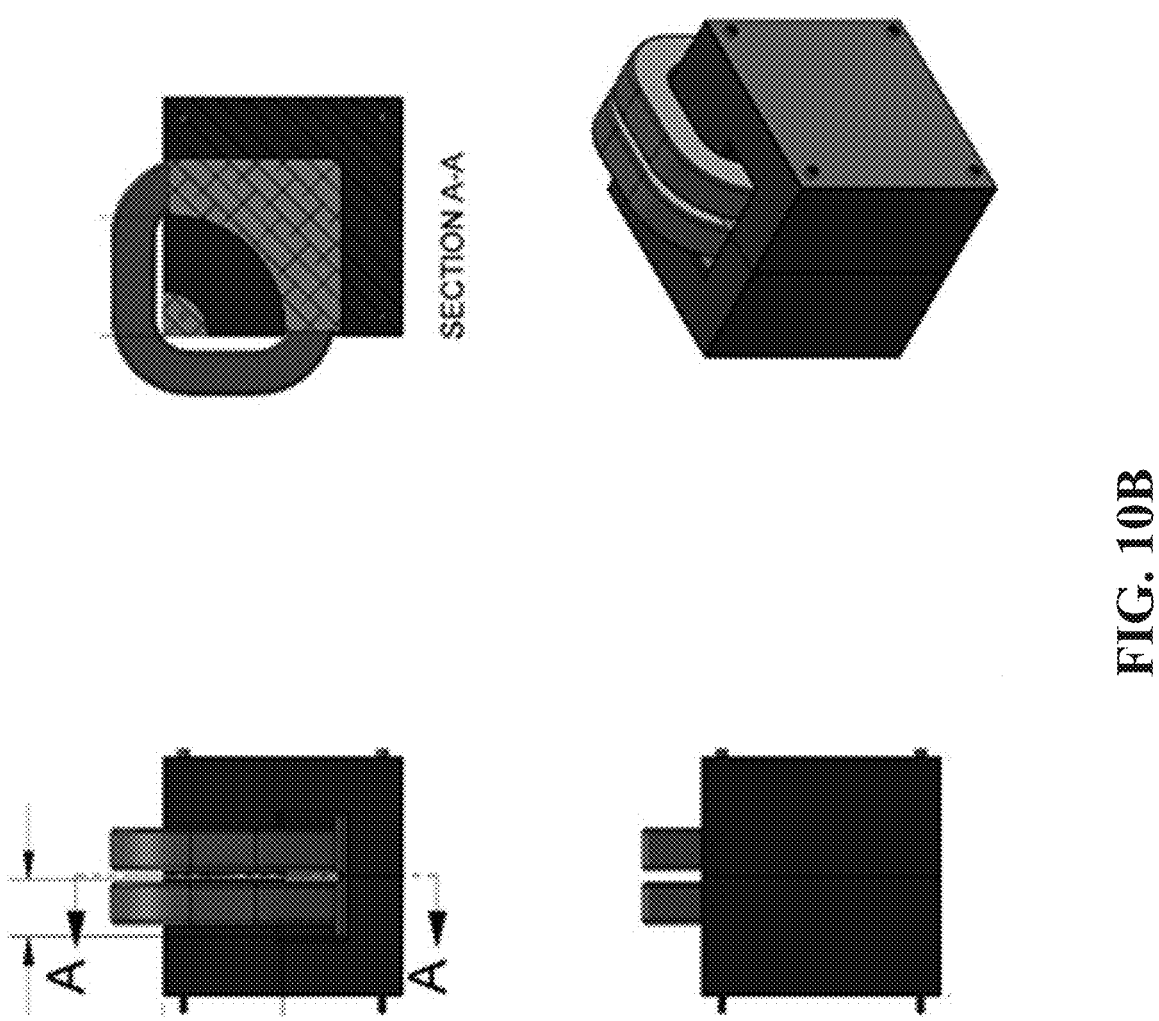
FIG. 10B illustrates an exemplary design of 90° bend magnet.
Figure 11:
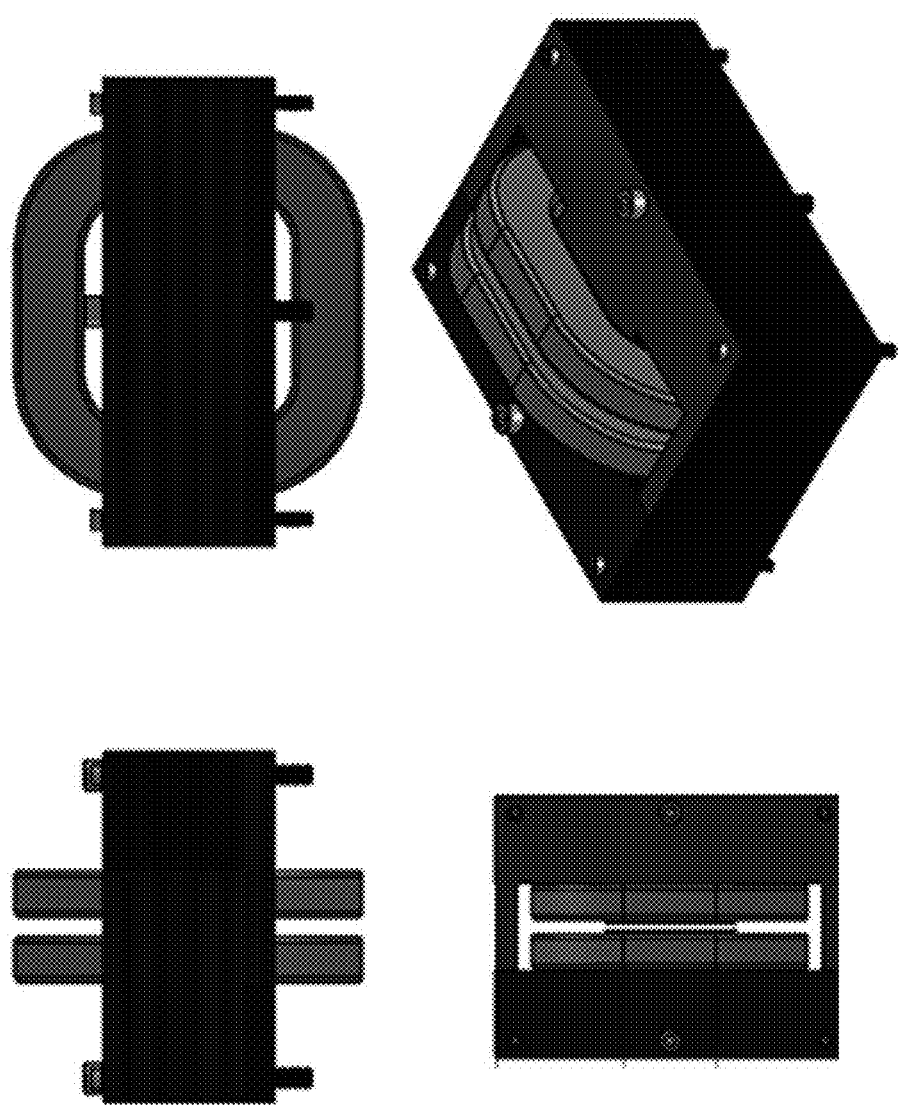
FIG. 11 illustrates an exemplary design of primary steering magnet.
Figure 12:
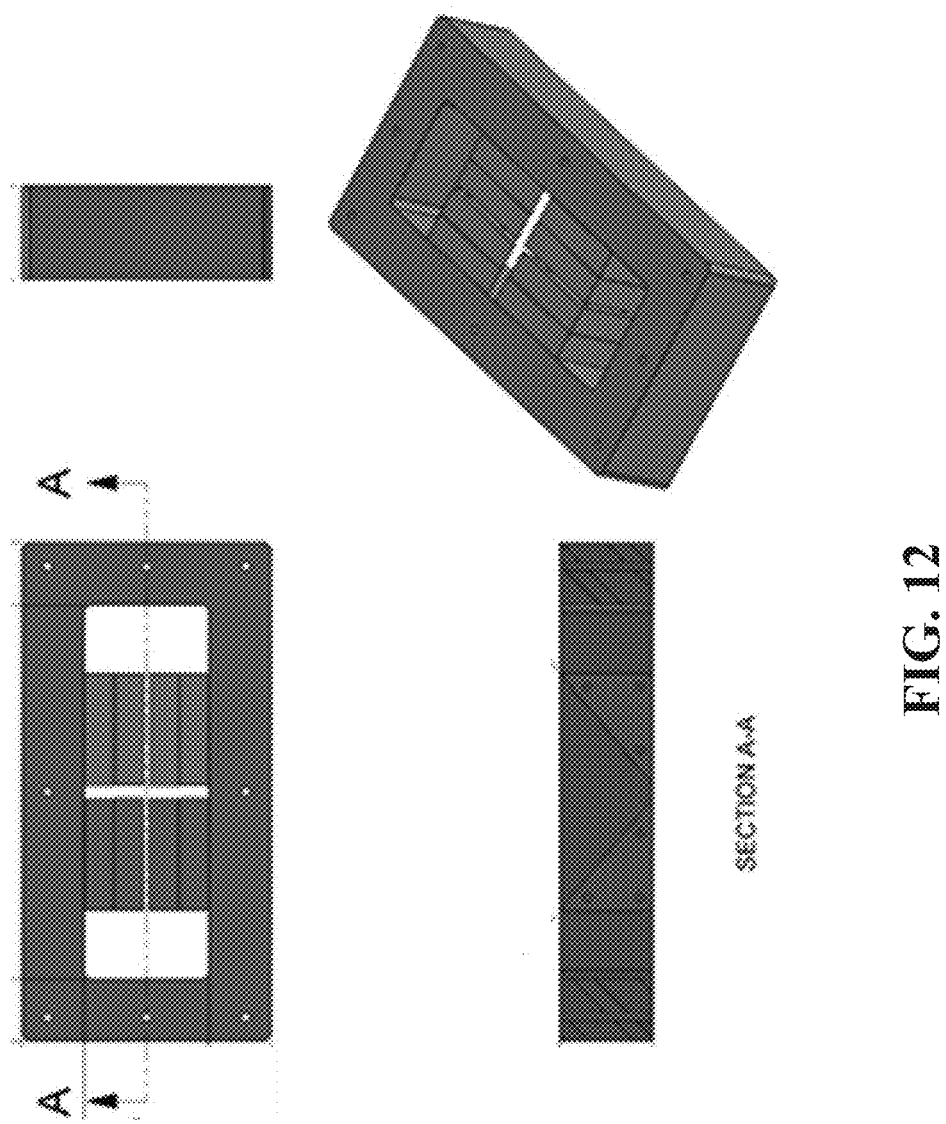
FIG. 12 illustrates an exemplary design of wedge steering magnet.
Figure 13:
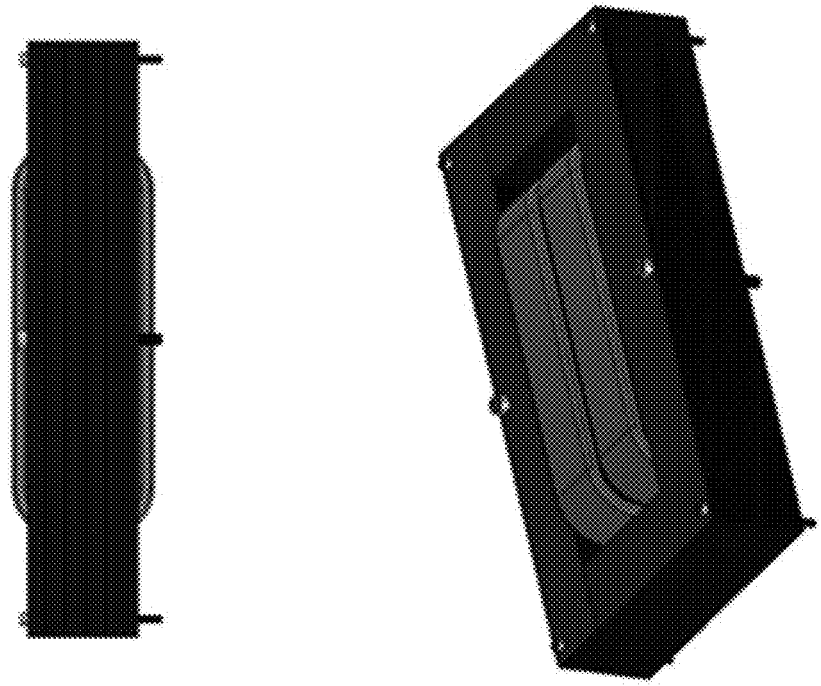
FIG. 13 illustrates an exemplary design of secondary steering magnet.
Figure 13:
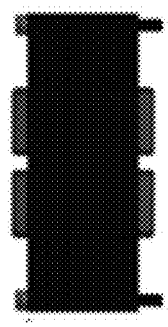
Figure 13:
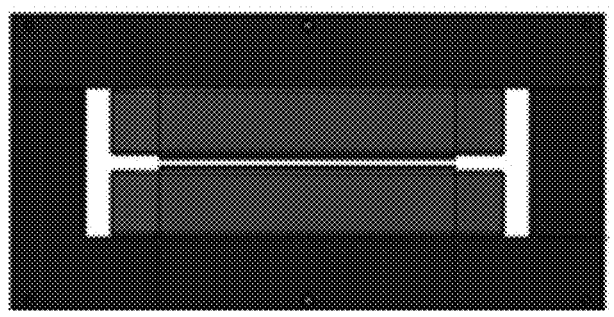

As shown in FIG. 1, the PES 100 includes a vacuum chamber 104 located in the main cabinet 103. The vacuum chamber 104 is structured to receive the charged particles from the charged particle source 102. A vacuum chamber 104 includes a charged particle inlet (shown as "electron inlet" in FIG. 10A) that receives the charged particles from the charged particle source 102. As shown in FIG. 10A, the vacuum chamber 104 includes an electron inlet located at a lower region of the vacuum chamber to receive the charged particle beam from the charged particle source 102.

Figure 21:
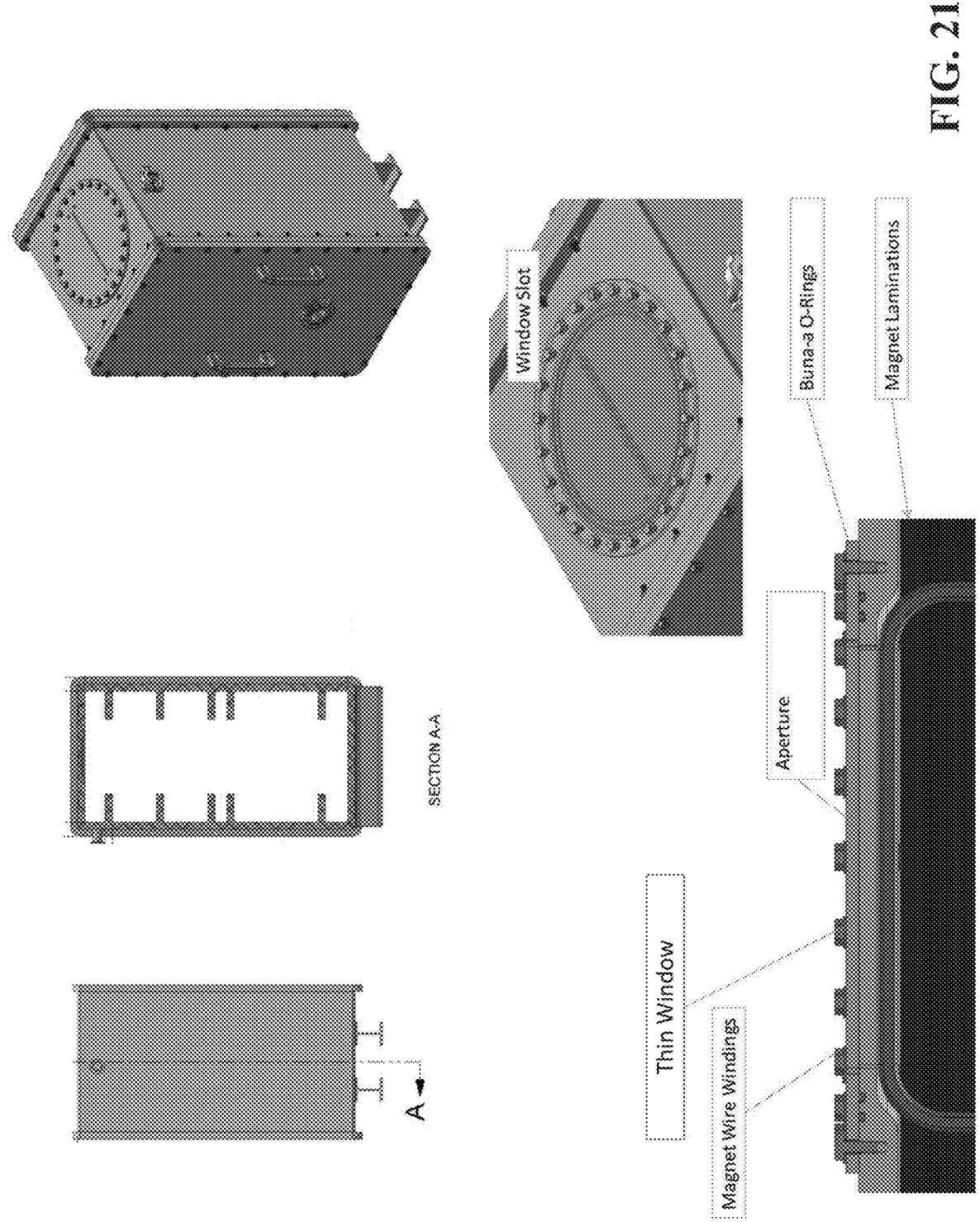
FIG. 21 illustrates an exemplary design of a vacuum chamber.

The charged particle beam may exit the vacuum chamber via a thin window on top of the vacuum chamber that accommodates the charged particle beam and that allows the charged particle beam to probe an object placed on the target object-holding and motion-control platform 108. FIG. 21 shows an exemplary design of the vacuum chamber 104 without the beam shaping and steering system. The top of the vacuum chamber, and the disk flange that mounts atop it, can have milled slits to pass the electron beam. The housing and flange can sandwich a thin sheet to maintain the vacuum while allowing passage of the charged particles. FIGS. 10A and 21 show the exemplary design of the thin window located on top of the vacuum chamber through which a fan charged particles beam obtained from the beam shaping and steering system exits the vacuum assembly.

FIG. 10A shows cut-away drawing of the exemplary vacuum system 104 in which a beam shaping and steering system 106 can be located. The beam shaping and steering system may be kept under vacuum because the air scatter over the beam's path length causes an unacceptable scatter of the beam. This vacuum does not need to be especially hard. For example, the vacuum chamber 104 can be designed to reach vacuum pressures of $10^{-3}$-$10^{-5}$ Torr with static deflection that may not exceed 0.012 in. Thermal modelling of the energy dissipated in the beam steering magnets predicts the maximum steady state temperature of the housing can be 135° F.

As illustrated in FIG. 1, the charged particles generated by the charged particle source 102 are received by a beam shaping and steering system 106 housed or located in a vacuum chamber 104. Thus, both the vacuum chamber 104 and the beam shaping and steering system 106 can be located in the main cabinet 103. The beam shaping and steering system 106 is designed to maximize the angular and entry position distribution of the charged particles on an item to be scanned. This can be accomplished by using magnets and magnetic fields to control the trajectory of the charged particles.

As shown in FIGS. 2A to 8, the beam shaping and steering system can include three independent magnets: a primary steering magnet, wedge magnets, and a secondary steering magnet. The primary steering magnet is used to raster the beam from a pencil beam received from the charged particle source 102 into a fan. The wedge magnets, which could be permanent magnets, catch the deflected fan beam and direct the electron back up in a vertical trajectory, resulting in a beam that is rastered in position but not in direction. The secondary steering magnet takes this rastered beam and adjusts the angles of electrons arriving at the object to be scanned so that multiple entry angles can be sampled through the scanned object. The design and operation of the wedge and secondary steering magnets can provide progressive stages of the beam shaping and steering system.

In an exemplary embodiment, the primary steering magnet can be an electromagnet that can raster quickly and the secondary steering magnet can switch between angles of incidence. This is advantageous because the primary steering magnet has a much smaller cross-sectional area and thus a much lower inductance, giving it a much shorter time constant, thus making it much more amenable to switching (and stabilizing) rapidly.

While FIGS. 2A to 8 show simulation where the beam enters from the top of the primary steering magnet and exists from the bottom of the secondary steering magnet. FIG. 10A shows that the vacuum chamber of the PES 100 receives the charged particles beam from the bottom, where the charged particle beam first interacts with the primary steering magnet, and then exists the top of the vacuum chamber after interacting with the secondary steering magnet. The orientation of the charged particle entering the vacuum chamber and the magnets can be reversed without impacting the operation of the PES 100.

Figure 2A:
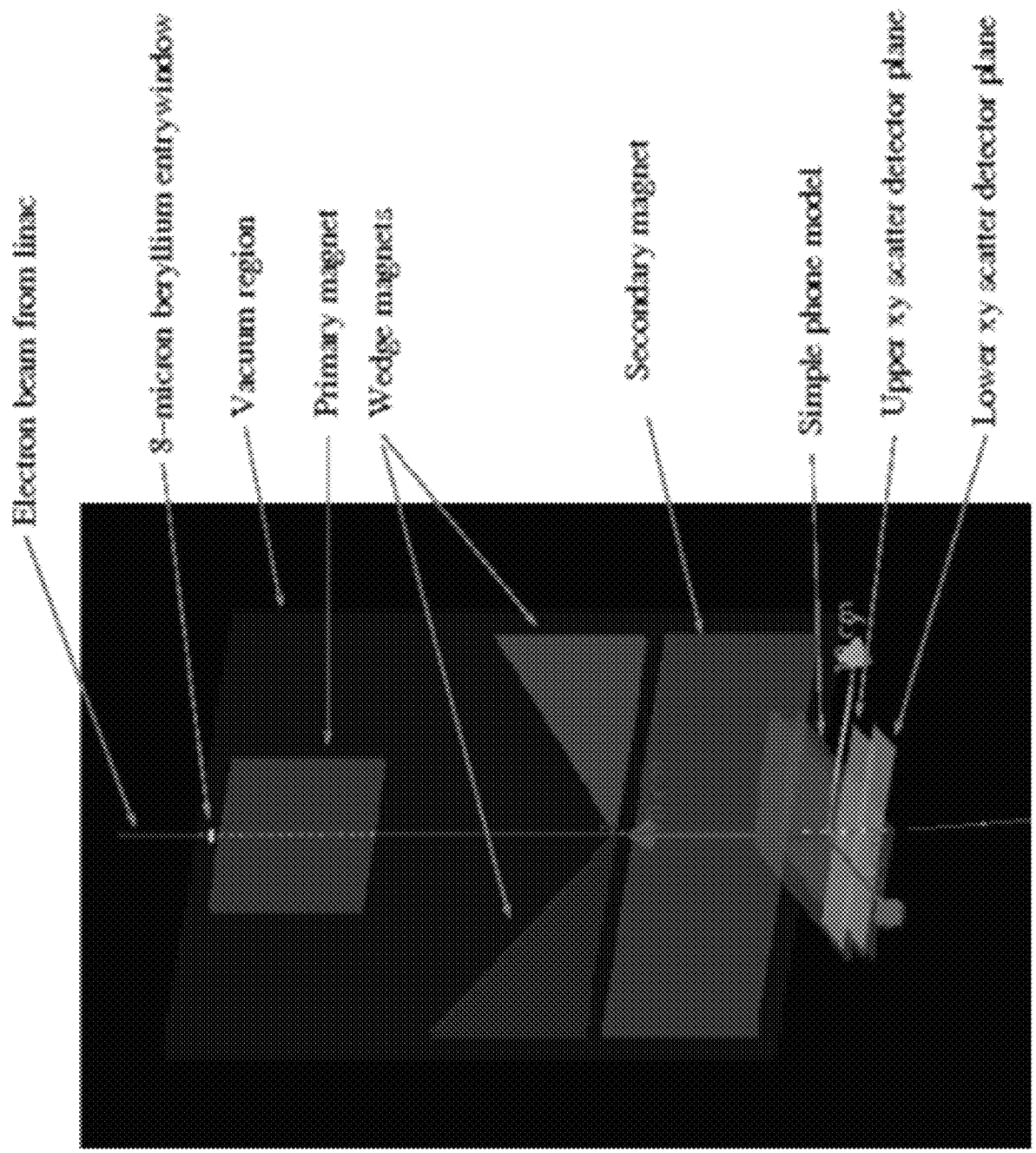
FIG. 2A illustrates an exemplary beam steering model in simulation software.
Figure 2B:
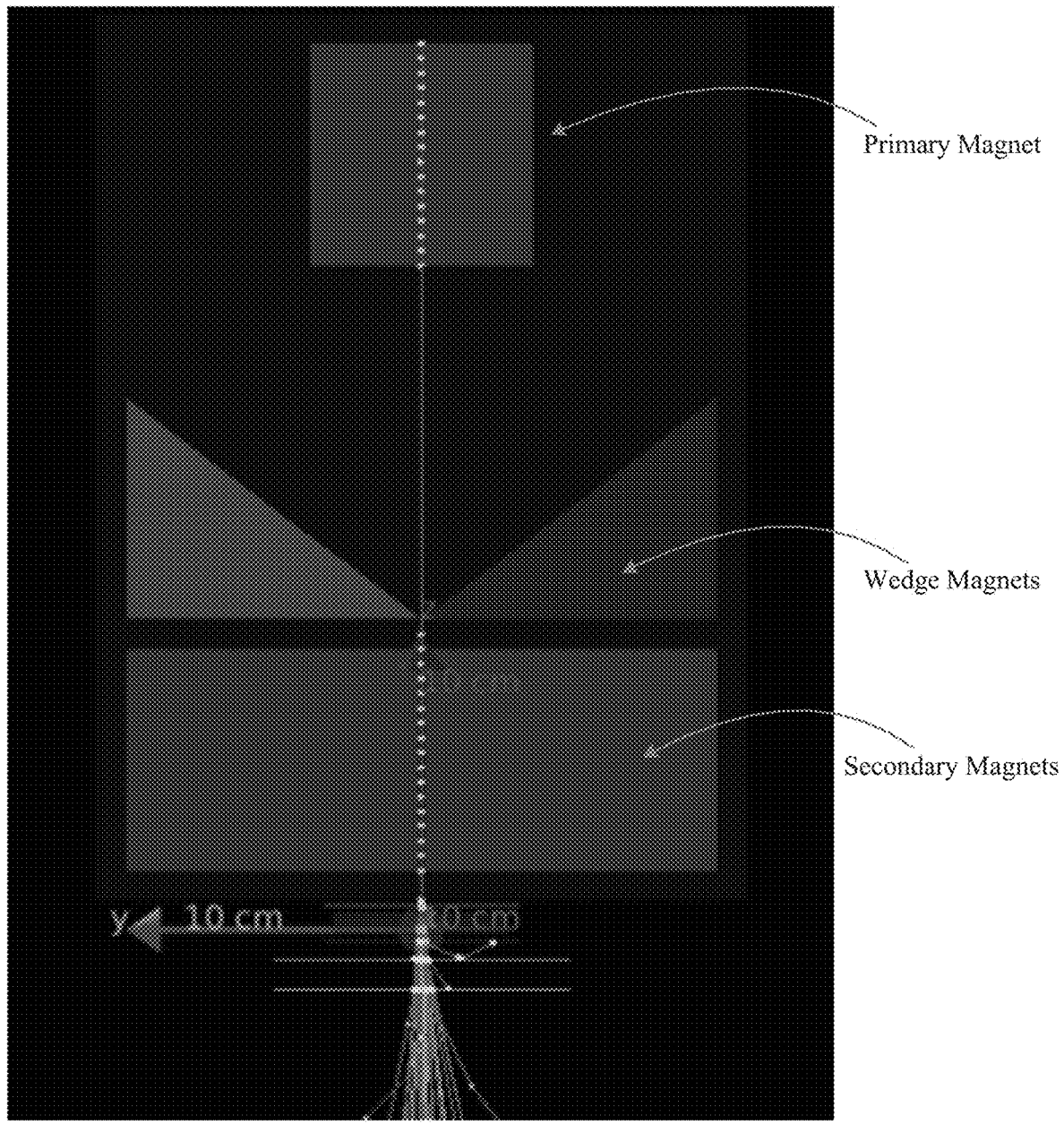
FIG. 2B illustrates a simulated scattering of an electron pencil beam through a mobile device.

FIG. 2A illustrates an exemplary embodiment of a simulation model for the beam shaping and steering system 106, where the object being scanned is chosen to be a personal electronic device such as a smartphone. FIG. 2B illustrates one state of the pencil beam as it passes through the scanned object, being scattered in the process. The simulation software models scattering statistics based on the material composition of the scanned object.

Figure 3:
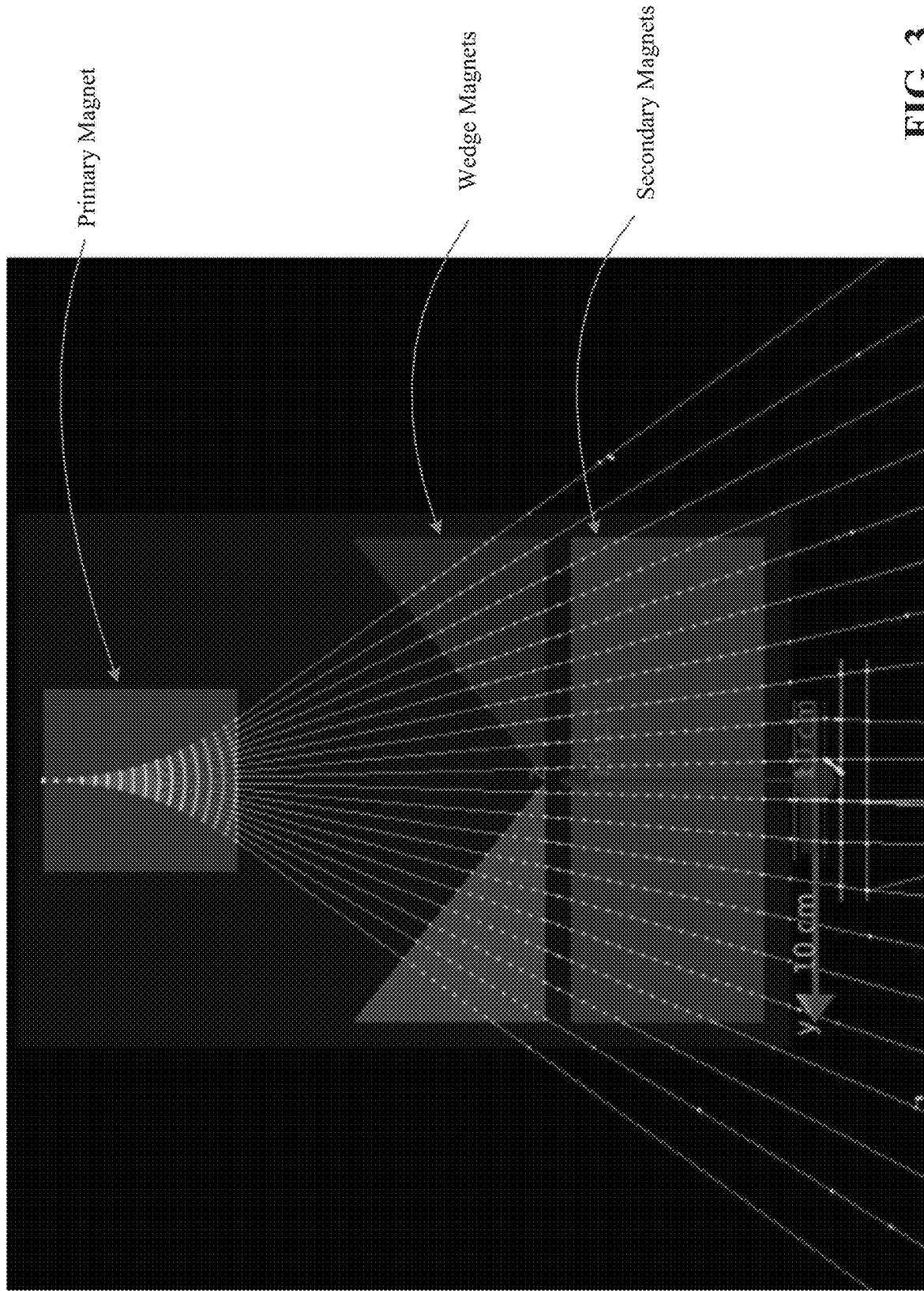
FIG. 3 illustrates a sweeping of the field of the primary steering magnet to raster the pencil beam effectively into a fan beam when the wedge magnets are not activated.

FIG. 3 illustrates an exemplary embodiment where the electron beam can be rastered by the primary steering magnet to form a fan beam. Active rastering of the pencil beam can be achieved by controlling the electric current in the primary steering magnet that can be accomplished by sweeping the magnetic field between appropriate limits under control of the imaging system software. In FIG. 3, the electron beam can be rastered by the primary steering magnet sweeping in, for example, twenty steps over a range of +/−0.6 tesla. Further, the wedge magnets are not activated in this simulation, so they do not deflect the beams.

Figure 4:
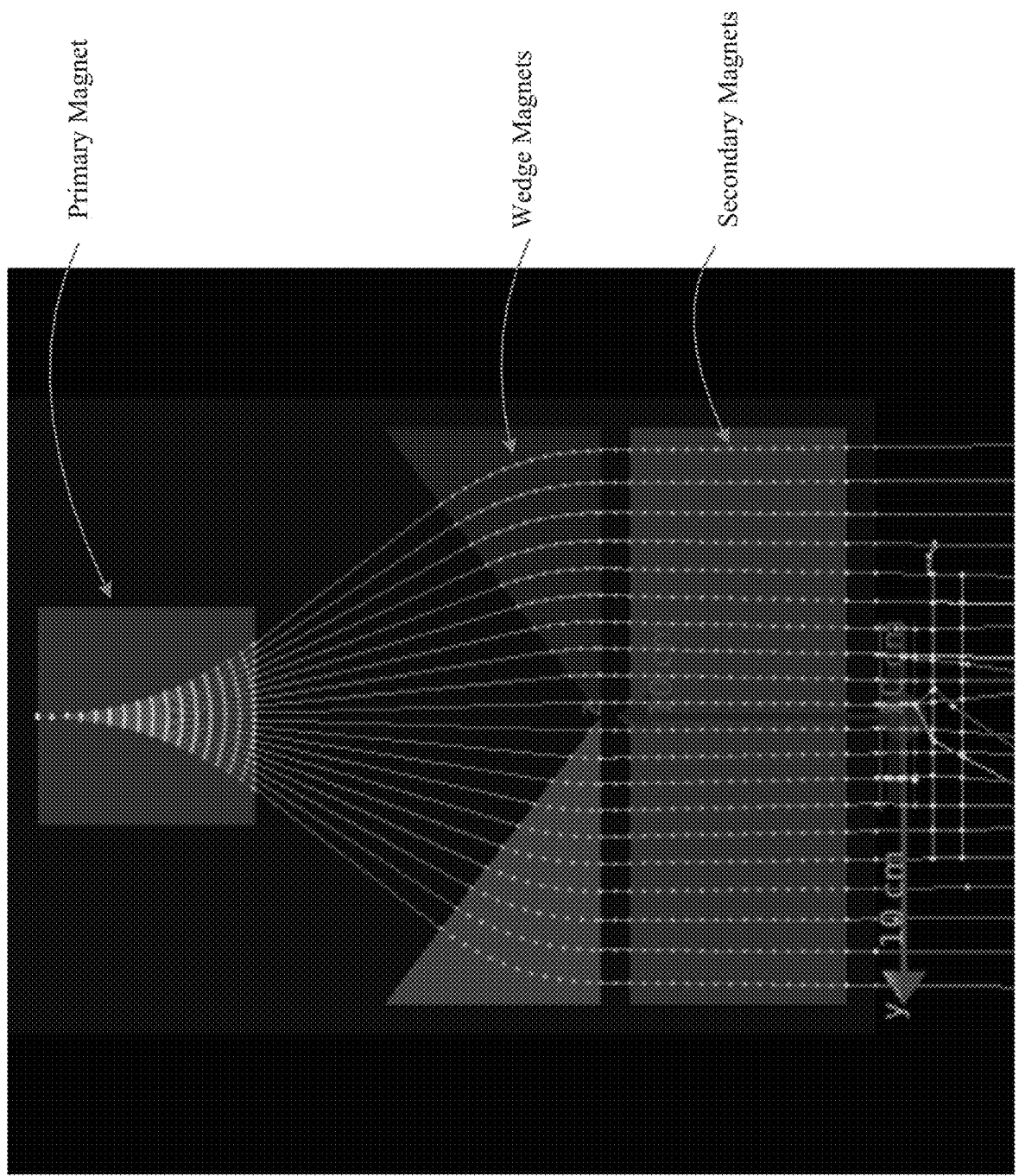
FIG. 4 illustrates the wedge magnets have a magnetic field of 0.8 tesla applied to them in opposite polarities to each other to create a rastered parallel beam across the inspection volume.

FIG. 4 illustrates an exemplary embodiment where the wedge magnets can be activated to bend the incoming fan beam into a rastered parallel beam, so that all parts of the object or a region of the object under inspection can be illuminated or scanned with the same incident angle. The fields on the wedge magnets are uniform but because of their triangular shape the length of field region traversed by the electrons is greater for electrons arriving from the primary steering magnet at a greater deflection. With the correct magnetic field strength on the wedge, the angular deflection induced by the primary steering magnet is removed and the beam is redirected into a parallel spread beam. The wedge magnet fields can be static and the bulk of their field could be provided by permanent magnets with a high-permeability flux return path, since the applied wedge magnet field never needs to change (assuming that the energy of the incident electron beam does not change). Optionally, small electromagnets can provide trim fields to correct imperfections in the wedge magnets' fields, or to compensate for variations in beam energy.

Figure 5:
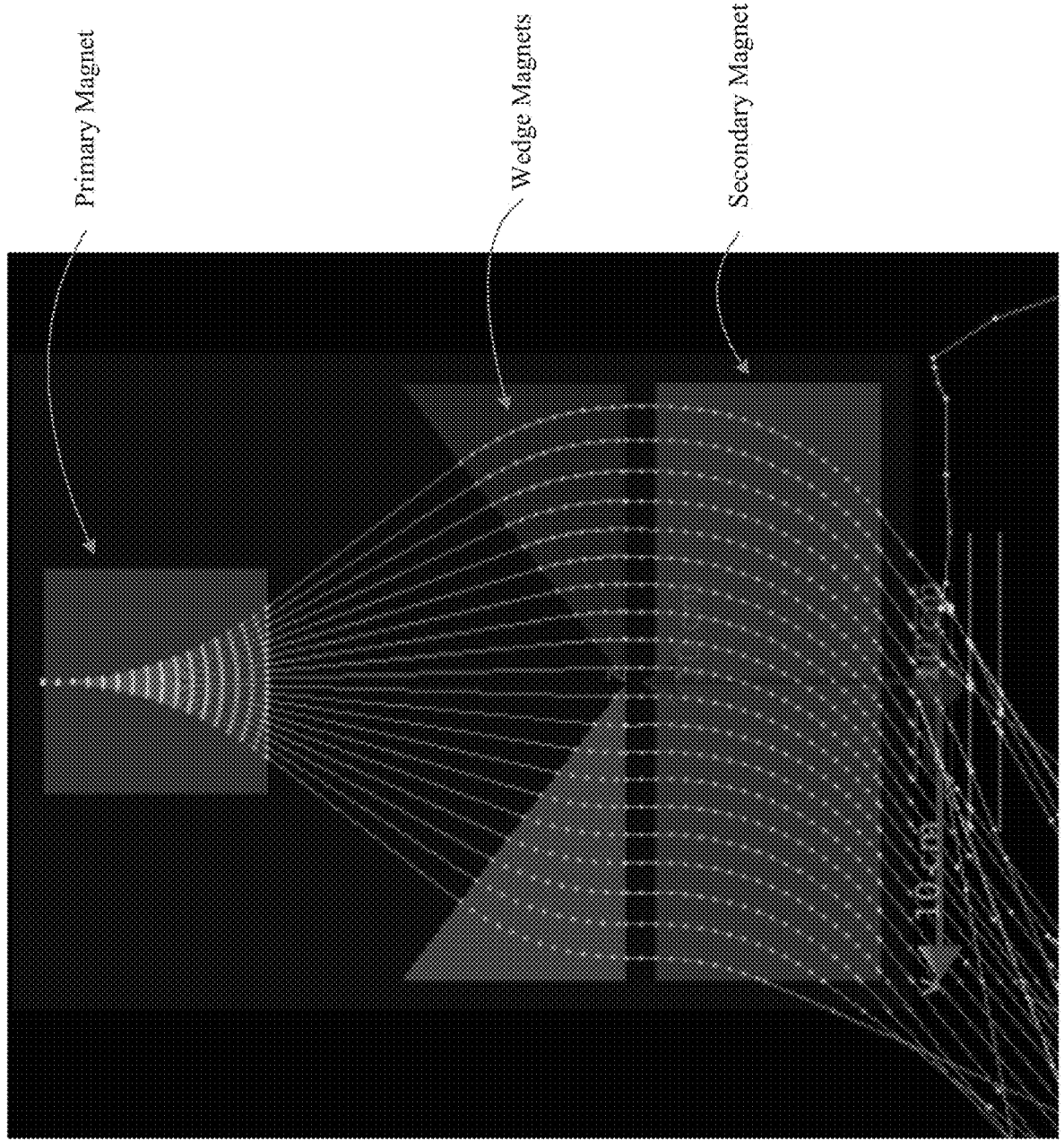
FIG. 5 illustrates the secondary steering magnet redirecting the parallel beam from the wedge magnets to a selectable entry angle for the scanned smartphone. An exemplary static field of 0.8 tesla is shown.
Figure 6:
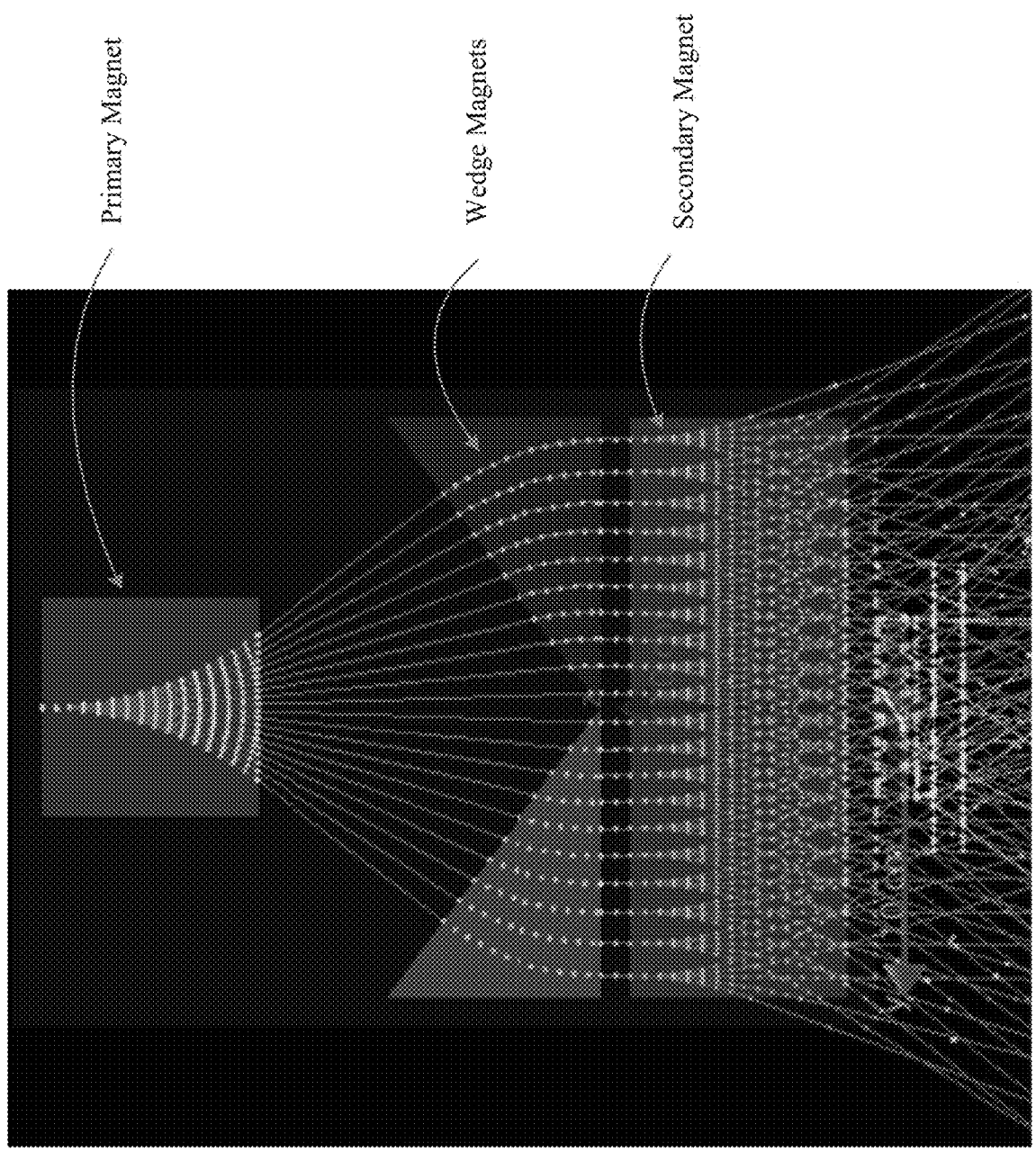
FIG. 6 illustrates sweeping the magnetic field of the secondary steering magnet selects a variety of illumination angles. In an exemplary simulation, the secondary steering magnet's field has been swept in five steps from −0.6 tesla to +0.6 tesla.

FIGS. 5 and 6 illustrate an exemplary embodiment where the secondary steering magnet can then take the parallel beam and redirect it to adjust the entry angle for electrons into the target device. This step can provide a range of illumination angles to improve the 3D tomographic image reconstruction, and in particular to resolve the depth coordinate in the relatively thin devices under inspection. Like the primary steering magnet, the secondary steering magnet can also be an electromagnet providing a range of fields to bend the parallel beam through a range of angles specified by the user, via system software.

Figure 7:
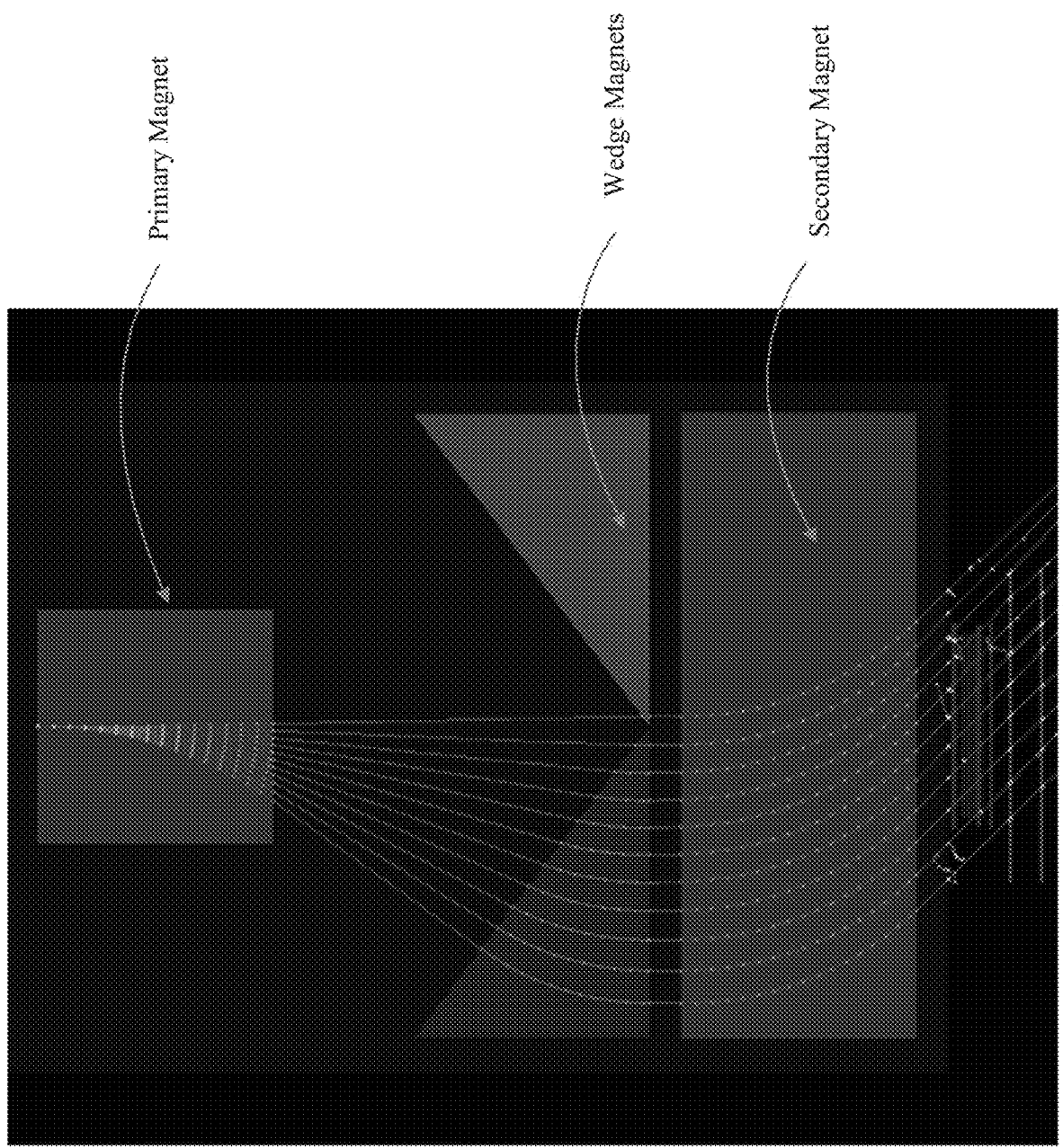
FIG. 7 illustrates biasing the fan beam to one side to enable the resulting oblique parallel beam to illuminate the entire width of an object under test or a region of the object under test.

FIG. 5 also illustrates that the skewed beam misses a part of the item under inspection. In an exemplary embodiment, beam can be adjusted to properly scan an item. For instance, as shown in FIG. 7, the primary steering magnet's rastering field can be adjusted to bias the rastered fan beam to one side of center. The wedge magnets can still produce a rastered parallel beam as before, but it is now also biased toward one side. The secondary steering magnet, when it bends the beam to produce an oblique angle of illumination, yields a beam impinging on the full area of the object under test.

Figure 8:
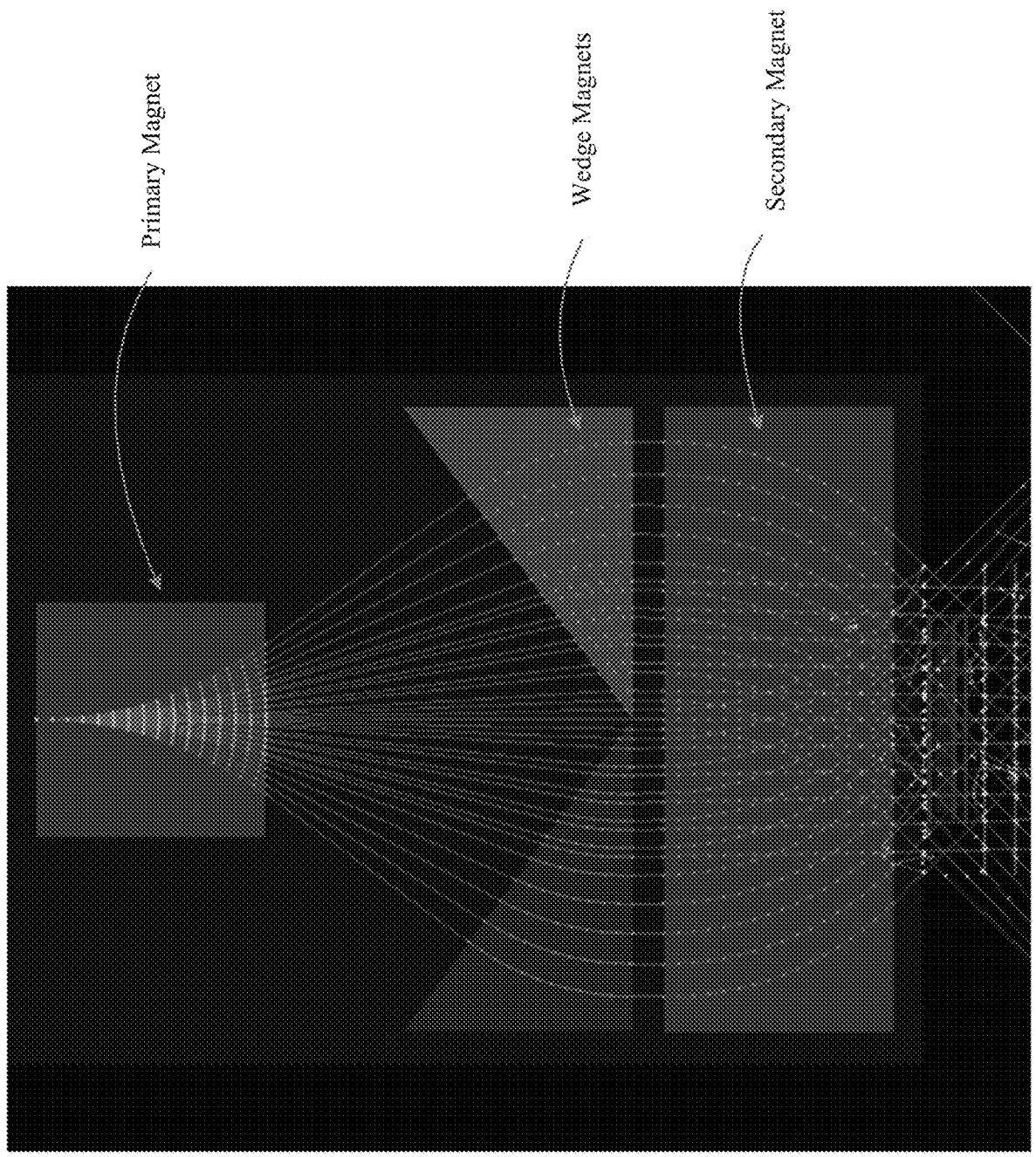
FIG. 8 illustrates the superposition of three illumination beams, showing a variety of illumination angles with beams illuminating the full width of the object under test or a region of the object under inspection.

FIGS. 6 and 8 superimpose all or a plurality of the angles of incidence to illustrate that they all can illuminate the entire width of an object under inspection or a region of the object under inspection. In an exemplary embodiment, the PES can produce a thin fan beam electron flux to probe an item, such as a phone. In one aspect, a phone will traverse the beam line for approximately 3 seconds (depending on phone length). A series of magnets steer the beam path and shape it into a fan, such that it illuminates the phone from multiple angles and directions.

As shown in FIG. 10A, the charged particles beam can enter the side of the vacuum chamber via an inlet. The charge particle beam go through the primary steering magnet from the bottom, where the primary steering magnet can sweep the beam left/right at 550 Hz. The beam can then be steered back to center by the permanent wedge magnets. The permanent wedge magnets can have a triangle shape. Finally, the secondary steering magnet at the top can sweep the beam left to right at 50 Hz. With this scheme, the electron beam can illuminate each 1 mm slice of the item, for example, a phone, from 11 angles, in the plane of the fan during the scan.

As shown in FIG. 10A, in addition to the primary steering magnet, wedge magnets, and a secondary steering magnet, the beam shaping and steering system may also include a bending magnet (shown as "90 deg. bend magnet") that can position the beam correctly by receiving the charged particle beam from the charged particle source 102 in a first orientation (e.g., horizontal) and by changing the orientation of the charged particle beam to a second different orientation (e.g., vertical). In some embodiments, the electrons exit from the side of the charged particle source 102 as a horizontal pencil beam and enter the electron inlet shown in FIG. 10A.

However, since the incoming and/or outgoing particle detection system, 107 and 110, are oriented vertically at a top region of the main cabinet 103 above a location where the charged particle beam enters the vacuum chamber 104 and/or beam distribution system 106, a 90° bending magnet bends the electron beam from horizontal direction to vertical direction towards the incoming and/or outgoing particle detection system 107 and 110. Thus, as shown in FIGS. 9C and 10A, a 90° bend magnet, located next to the output of the charged particle source bends the electron beam from horizontal direction to vertical direction or trajectory into the scanning magnets.

Figure 9A:
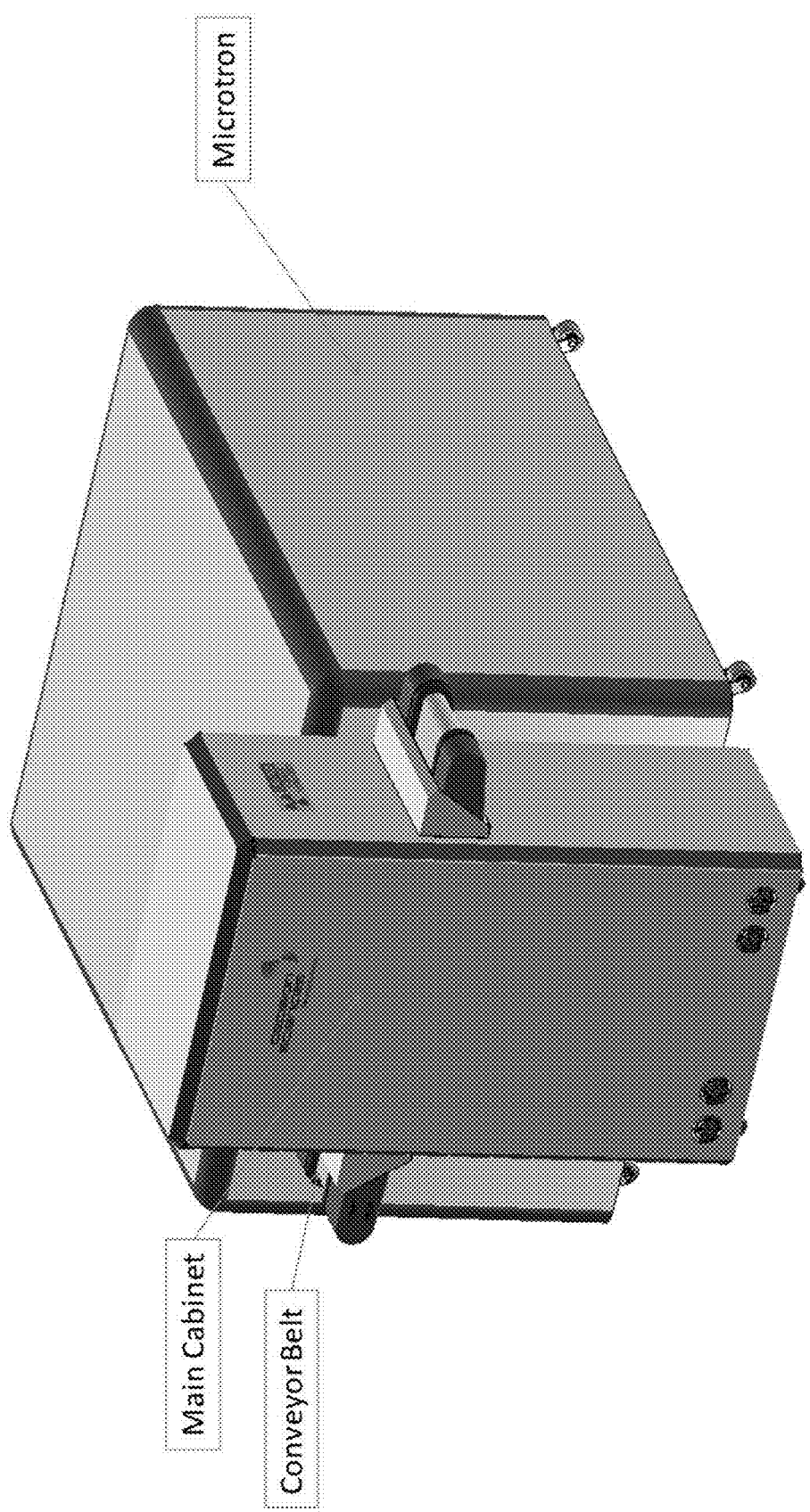
FIG. 9A illustrates an exemplary PES system with a microtron where the user can load items onto conveyor belt and the operator station can be placed according to customer needs.
Figure 9B:
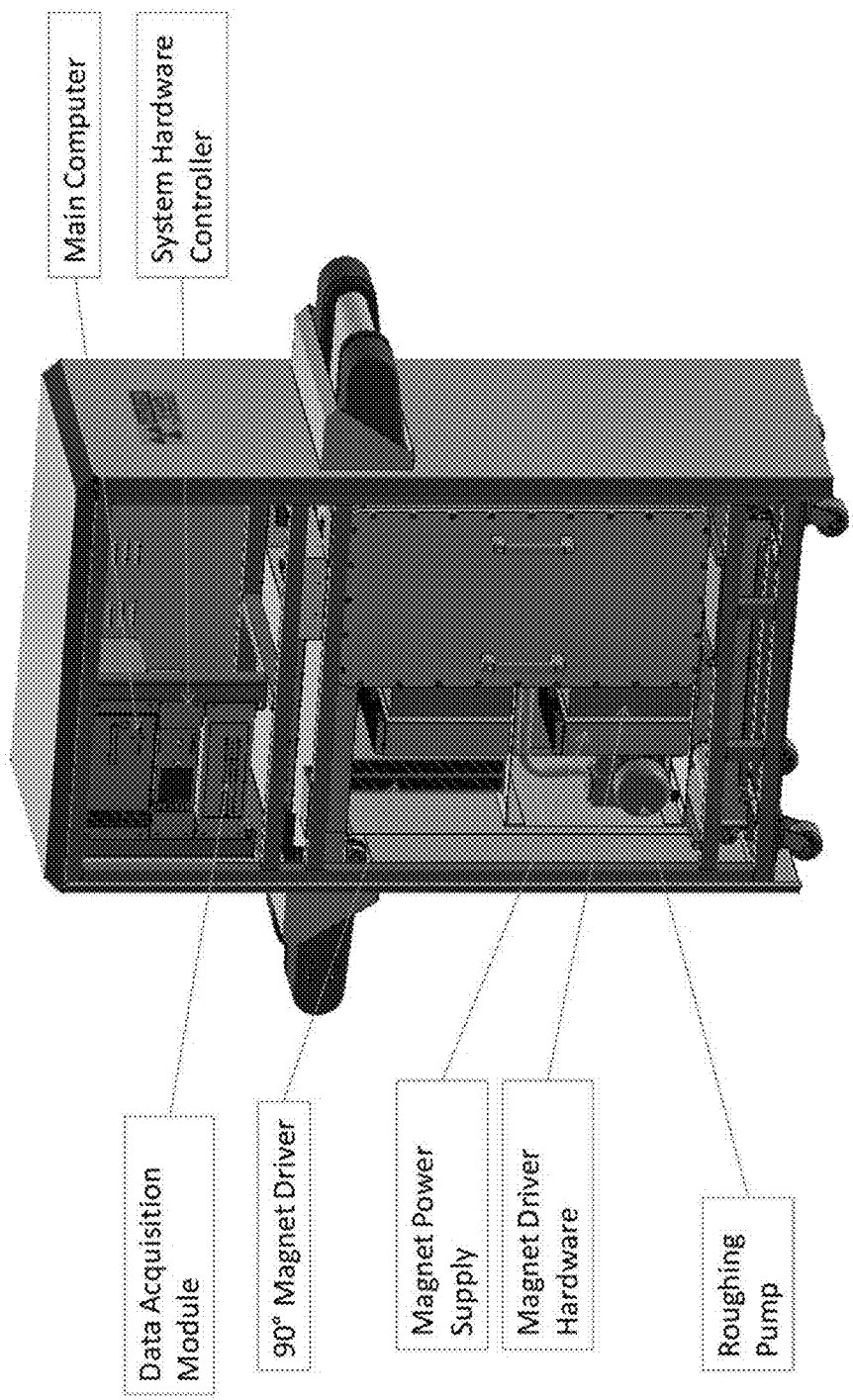
FIG. 9B illustrates a cut-away view of the exemplary main cabinet that can house the computer, vacuums system with beam shaping and steering system, one or more vacuum pumps, and steering magnet power supplies.
Figure 9C:
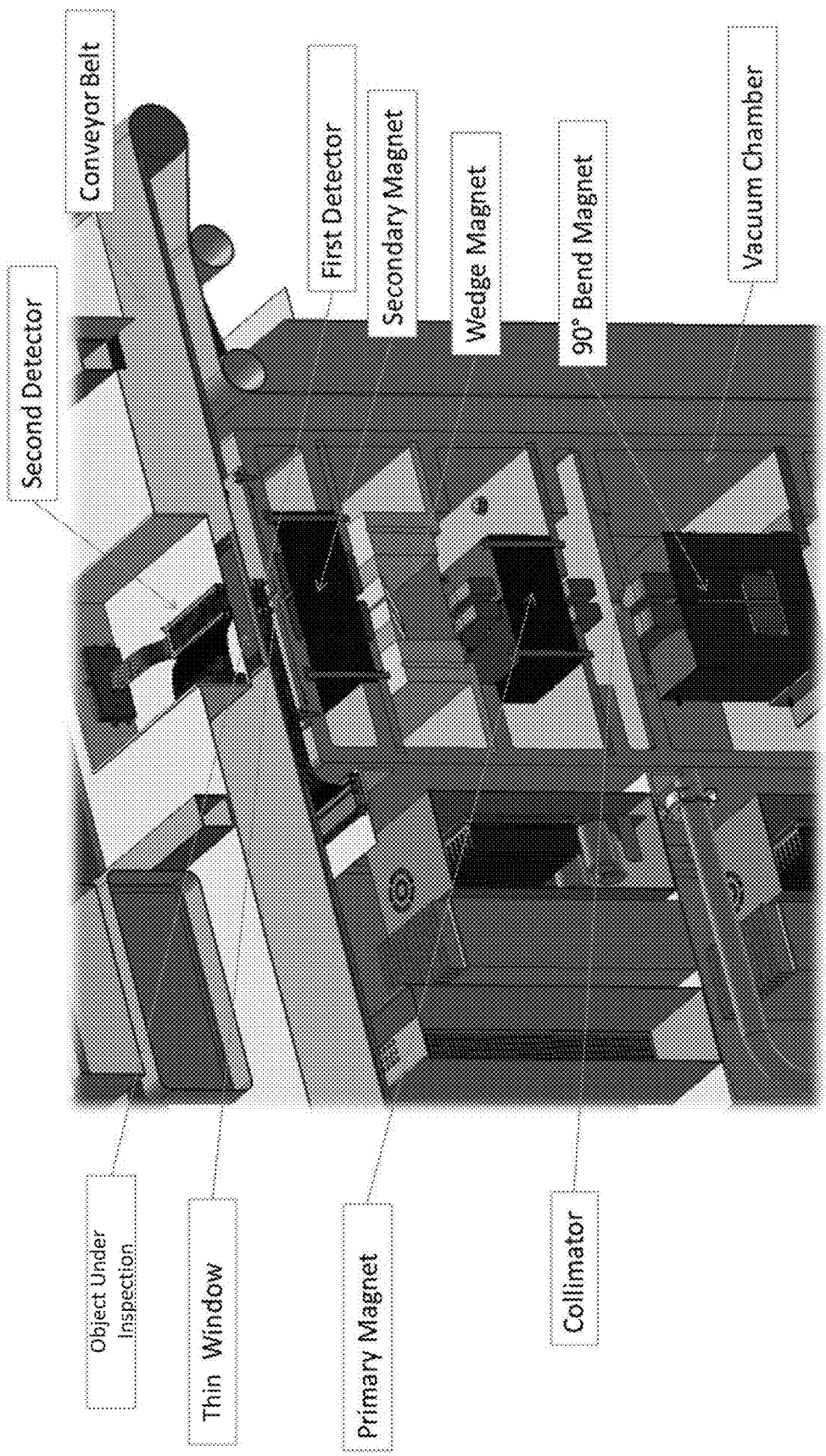
FIG. 9C illustrates a cut-away of the exemplary main cabinet that shows the tracking system (top) and beam steering magnets (bottom-right).

As shown in FIG. 9C, above the bending magnet can be located a tungsten collimator to absorb any stray electrons or any electrons that are not on the correct trajectory toward the primary steering magnet. This reduces shielding requirements downstream and reduces contamination to the acquired tracking data (e.g., electron energy). The bending magnet assembly can also contain a built-in beam dump comprising a mass of aluminum. The beam dump will absorb the electron beam in the case of steering system failure, or other upstream problems. Radiation leakage from the beam dump can be monitored and connected to a safety interlock, which will shut down the electron source in the event of any issues.

FIG. 10A shows a cut-away drawing of the exemplary vacuum system and beam shaping and steering system. The beam enters horizontally from the bottom, directly into the 90° bending magnet. The bending magnet redirects the electron beam vertically upwards. The pencil beam then enters a collimator, which may narrow the beam spatially and energetically, and exits the collimator towards the primary steering magnet. The pencil beam then travels through the primary, wedge, and secondary steering magnets, sequentially. The exiting electron beam is a rastered fan. The fan beam exits the vacuum assembly via a narrow slot in the housing, through a thin window.

FIG. 10B, FIG. 11, FIG. 12, and FIG. 13 show the exemplary designs for the 90° bending magnet, the primary steering magnet, the wedge magnets, and the secondary steering magnets, respectively.

In FIG. 1, a target object-holding and motion-control platform 108 (shown as a conveyor belt in FIG. 9C) is located above the vacuum chamber 104. The target object-holding and motion-control platform 108 can move an item through the scan region. Above the target object-holding and motion-control platform 108 is an outgoing particle detection system 110 (shown as second detector in FIG. 9C). The outgoing particle detection system 110 includes two scatter detector planes. In some embodiments, each plane can measure the xy position of each electron passing through. The two planes combined can allow the exit position and trajectory of each electron exiting the scanned object to be measured. In some embodiments, an incoming particle detection system 107 (shown as first detector in FIG. 9C) can be located in between the vacuum chamber 104 and the target object-holding and motion-control platform 108, where the incoming particle detection system 107 can also include two scatter detector planes.

Figure 16:
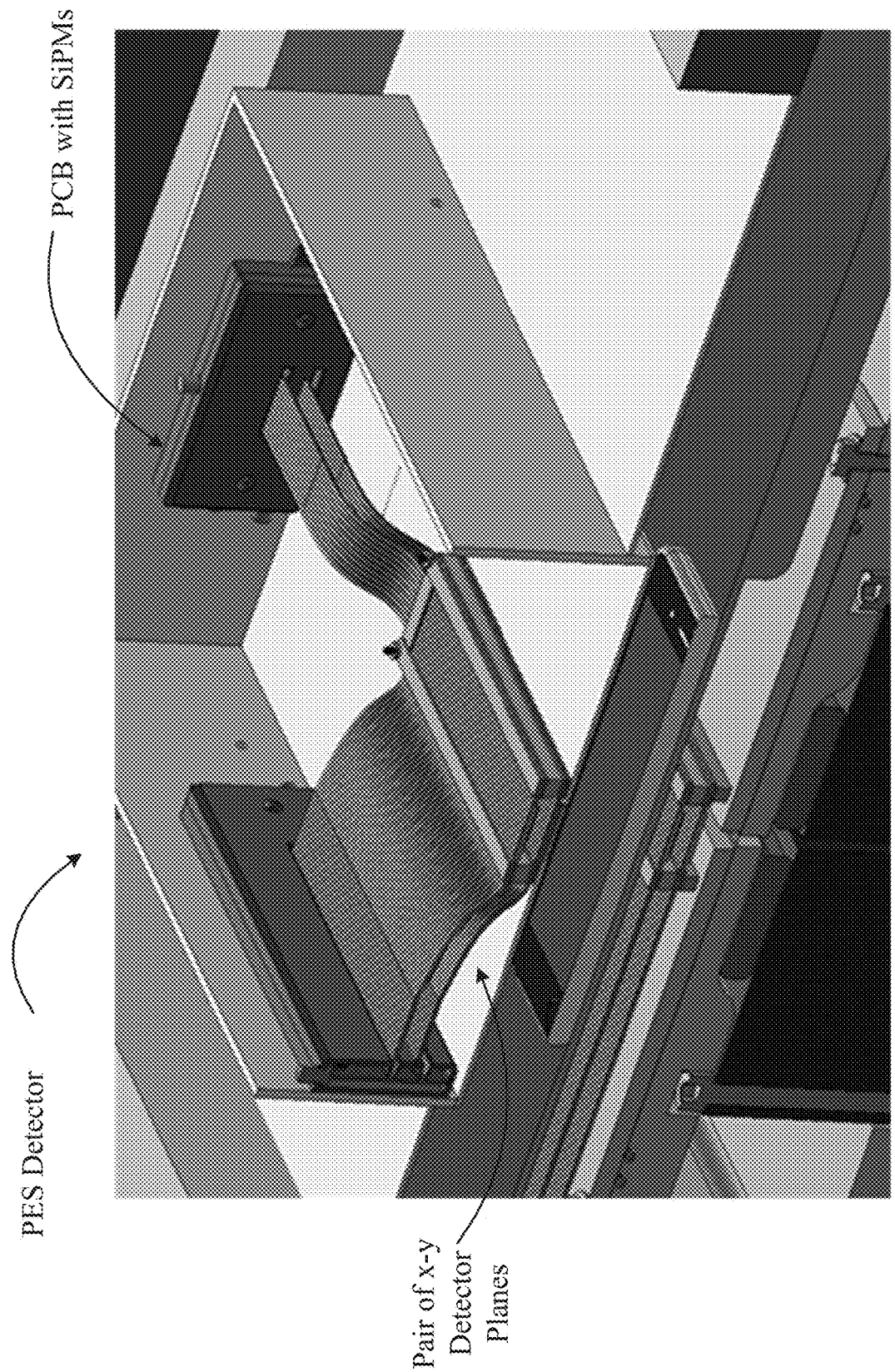
FIG. 16 illustrates a cut away view of the exemplary outgoing particle detection system housing where ribbon cables of fiber of the outgoing particle detector system can be coupled to arrays of silicon photomultipliers in a light-tight enclosure.
Figure 18:
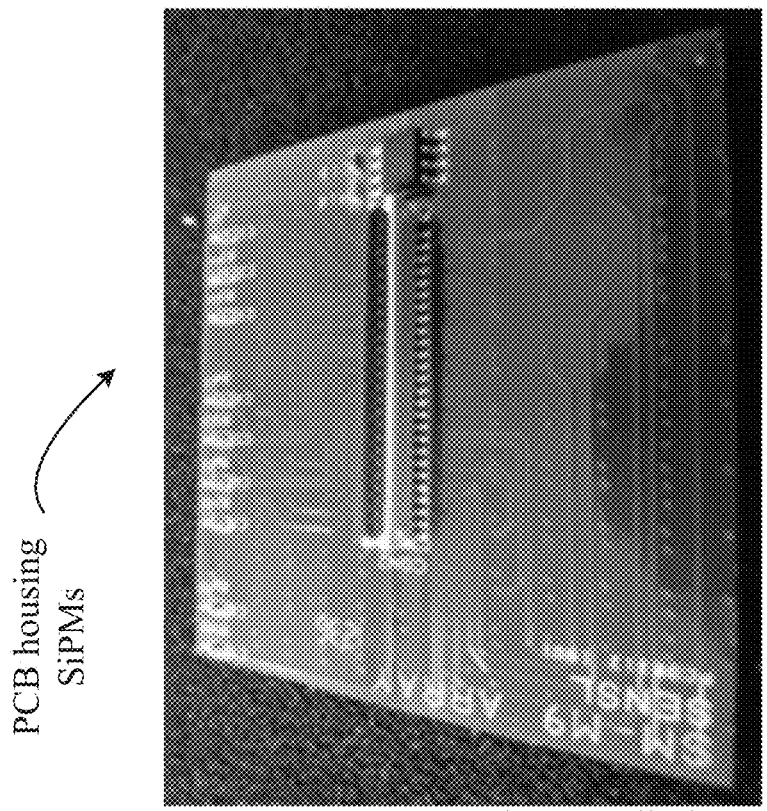
FIG. 18 shows a photo of the exemplary silicon photomultipliers (SiPMs) mounted as a grid (e.g., 12×12) of detectors on a printed circuit board (PCB) (left); and back of exemplary PCB with each anode output at a connector, shared components for power conditioning (right).
Figure 18:
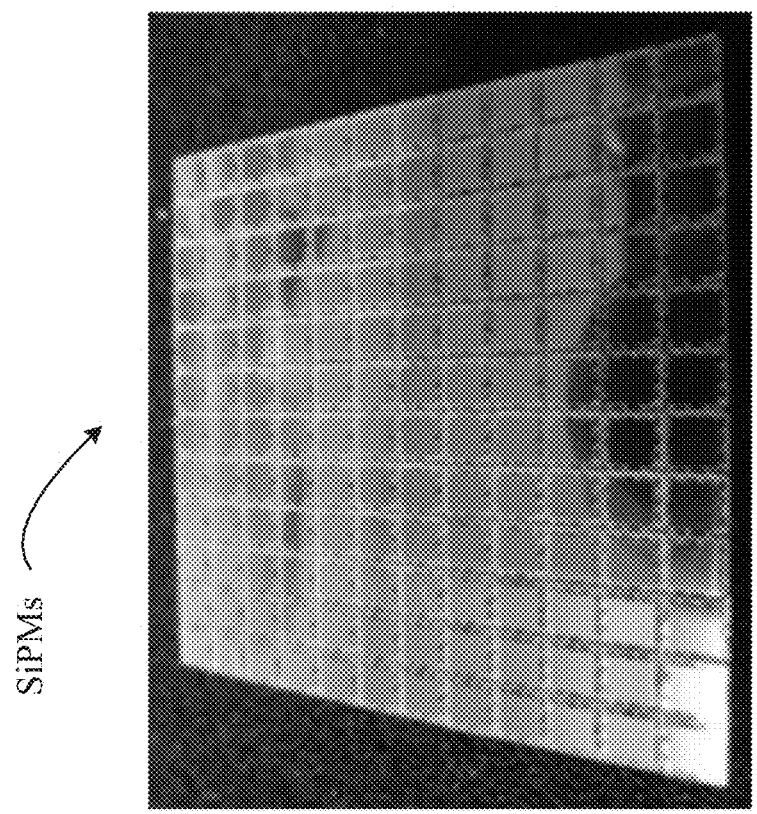

The scatter detector plane of the incoming and outgoing particle detection systems 107 and 110 include detector channels, where each detector channel can include a scintillating fiber. The scintillating fiber converts a small fraction of the energy from the electrons into photons. Because the scintillating fibers of the two scatter detector planes have a low areal density (density times the thickness of the material), allowing the electrons to pass through without significant deflection or attenuation, the electrons can reach the object under test and the calorimeter (shown as 111 in FIG. 1) located above the outgoing particle detection system 110. The scintillating fibers can be coupled to silicon photomultipliers (SiPMs) which convert the photons into current. The SiPMs can be located at one end of the fibers outside the scan volume. In an exemplary embodiment, the SiPMs can be small surface mount chips, 1.5 mm square, with a 1 mm sensitive area on the face of the chip. The SiPMs can be mounted as a grid array, with shared power bias voltage applied to the cathodes. FIGS. 16 and 18 show an example of such a grid and the PCB which would house it.

The current can be read out, as a voltage, through low voltage differential signaling (LVDS) at a signal processing unit, such as an FPGA based data acquisition system, which may be located in the computer 114. In an exemplary embodiment, a single particle tracking detector (e.g., either 107 or 110) can comprise two x-y planes, four layers total. Scintillating fibers included in a layer can be parallel to each other and the orientation of one set of fibers in one layer can be perpendicular to the orientation of another set of fibers in another layer. One benefit of two x-y plane fibers is that it can measure both position and direction of the charged particles in the PES detector. The charged particles beam is rastered in one dimension and the scattering of the particles takes place in two dimensions. One benefit of having one layer perpendicular to another layer is to allow the PES detector to measure the scattering in two dimensions to maximize the information extracted. Two PES detectors 107 and 110 could be used for the system: one detector 107 to measure the trajectory of the incoming particle (before reaching the item) and another detector 110 to measure the outgoing trajectory.

Figure 14:
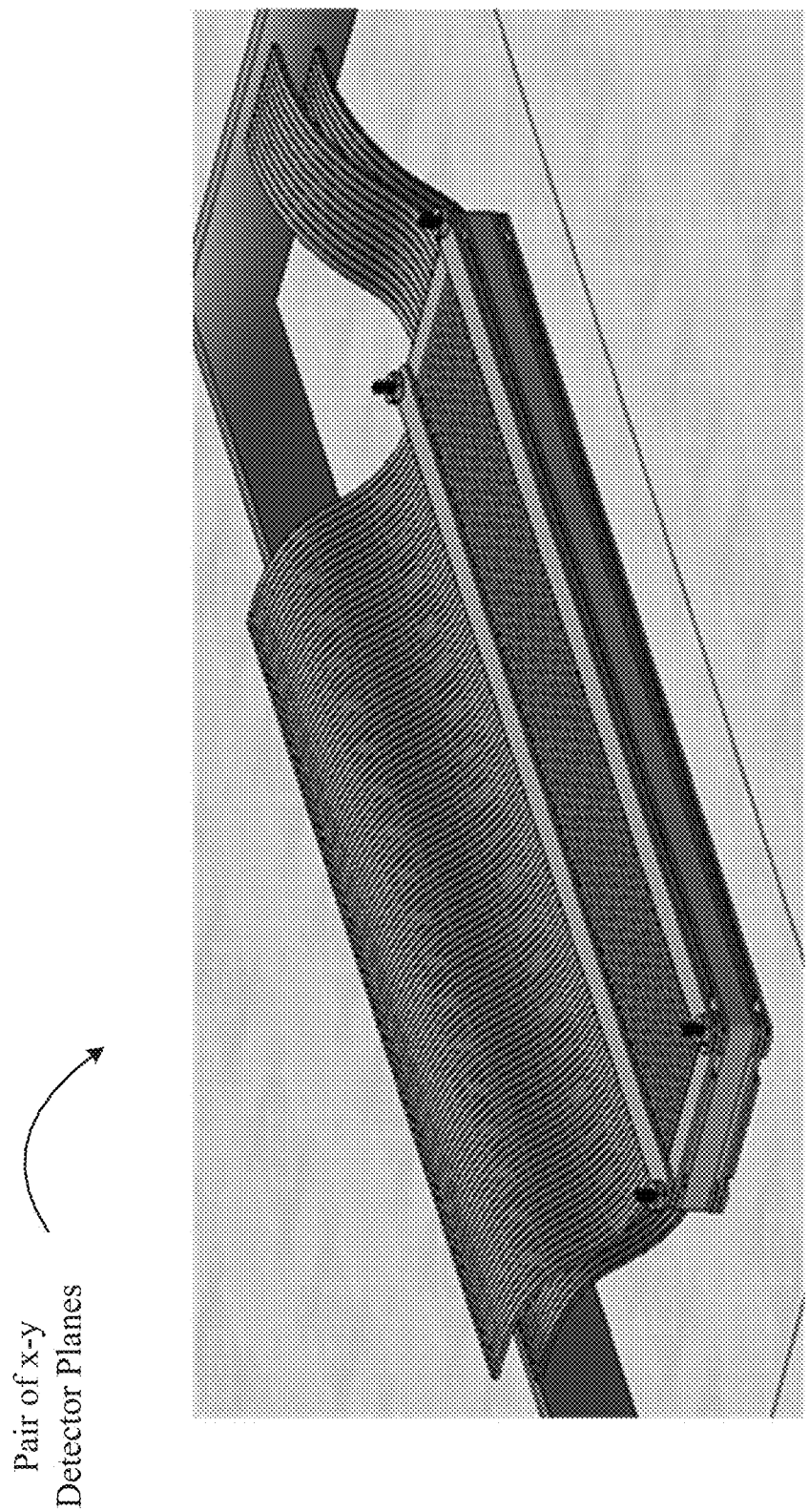
FIG. 14 illustrates an exemplary pair of x-y detector planes.

In one embodiment, the incoming and outgoing particle detection systems 107 and 110 can be made from commercially available scintillating fibers. Spatial resolution in particle trajectory fitting can be determined by fiber cross sectional area. The detector geometry can be 200 mm×20 mm to accommodate the fan beam exiting from the beam shaper. FIG. 14 shows an exemplary model of a single detector plane that can be 200 mm×20 mm, 4 layers, two along x and two along y. In another embodiment, the PES detector can be made from silicon microstrips.

Figure 15:
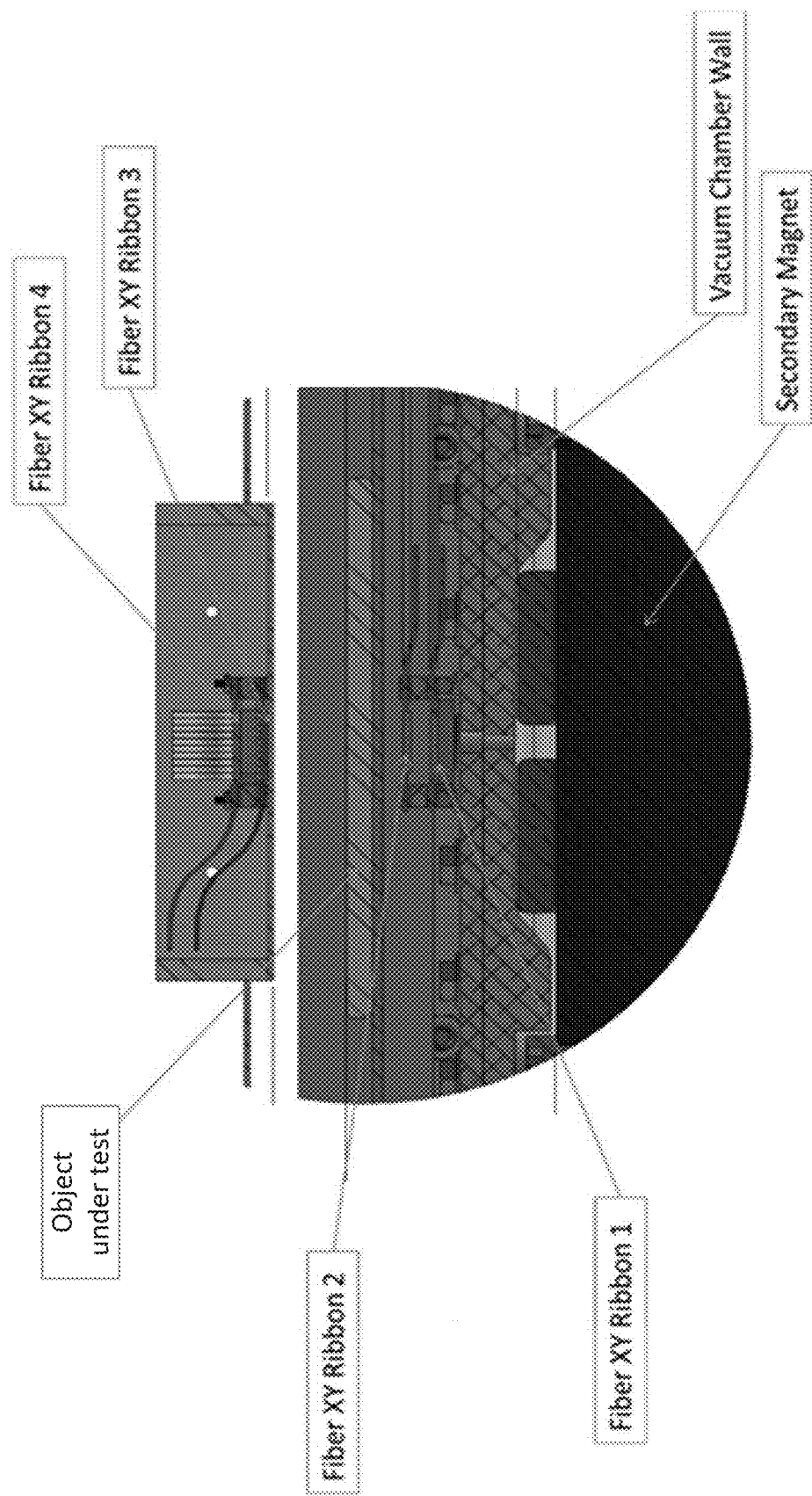
FIG. 15 illustrates a side view of the exemplary detector modules.

FIG. 15 shows a side view of the PES, including the exemplary particle tracking detectors and the vacuum chamber. The incoming particle detection system is shown with "Fiber XY Ribbon 1" and "Fiber XY Ribbon 2." and the outgoing particle detection system is shown with "Fiber XY Ribbon 3" and "Fiber XY Ribbon 4." Each detector module can be several mm thick in total, and has two x-y planes that can be separated by a few mm. The separation of x-y planes is needed to solve $$\frac{dx}{dz} \text{ and } \frac{dy}{dz}.$$

Figure 17:
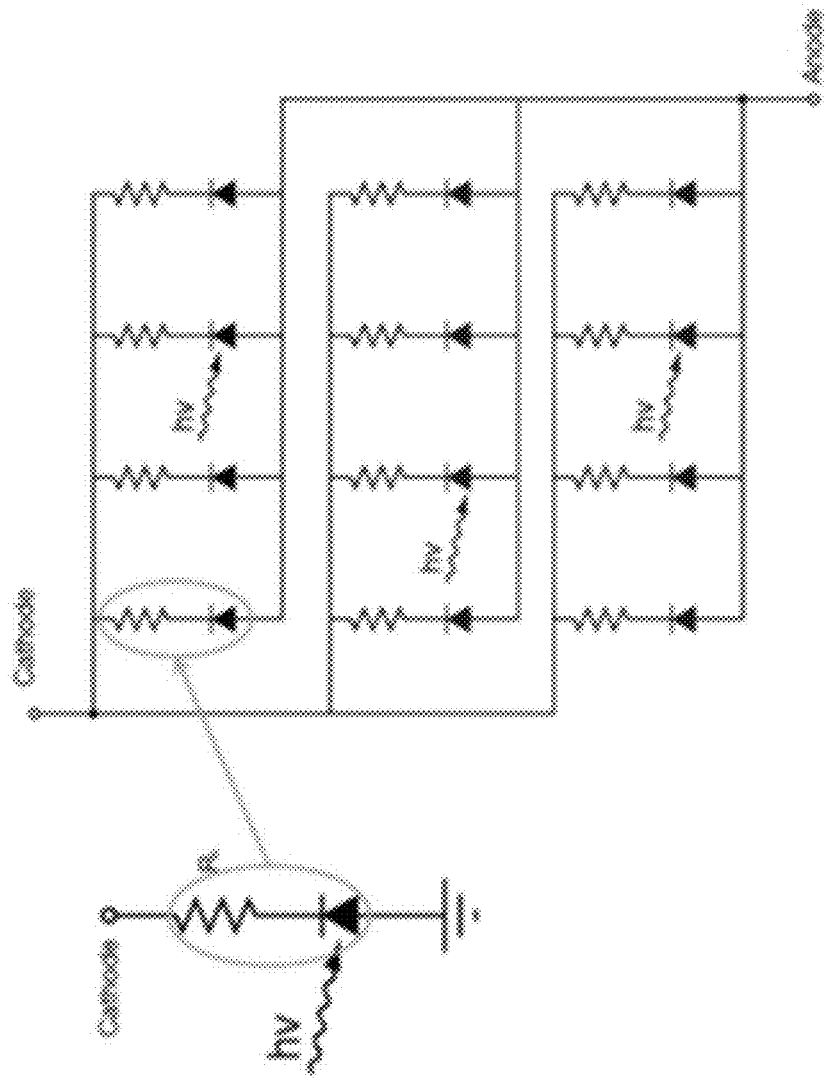
FIG. 17 shows an exemplary schematic of silicon photomultiplier comprised of multiple microcells, each with an avalanche photodiode and a quenching resistor.

FIG. 16 shows an exemplary scatter detector planes of the outgoing particle detection system where each fiber of each scatter detector plane of the outgoing particle detection system can be coupled to a silicon photomultiplier (SiPM). Each SiPM can be an array of avalanche photodiodes (APD) in series with a quench resistor. Collectively the APD and quenching resistor are called a microcell. The SiPMs (and therefore, all or a plurality of microcells) can be biased at a few tens of volts DC. A photon incident on a single microcell causes a breakdown of the internal field inside the photodiode and a rush current ensues. The quenching resistor converts that current to voltage and quells the current rush until the diode's internal field is restored. Multiple microcells increase dynamic range, allowing the SiPM to measure hundreds to thousands of photons simultaneously (depending on the particulars of the microcell). FIG. 17 shows an exemplary schematic of the microcells in a SiPM. Bias voltage can be applied to the cathode and readout can be made at the anode. The fibers of the incoming particle detection system can be similarly coupled to a PCB with SiPMs as discussed for the outgoing particle detection system.

Figure 19:
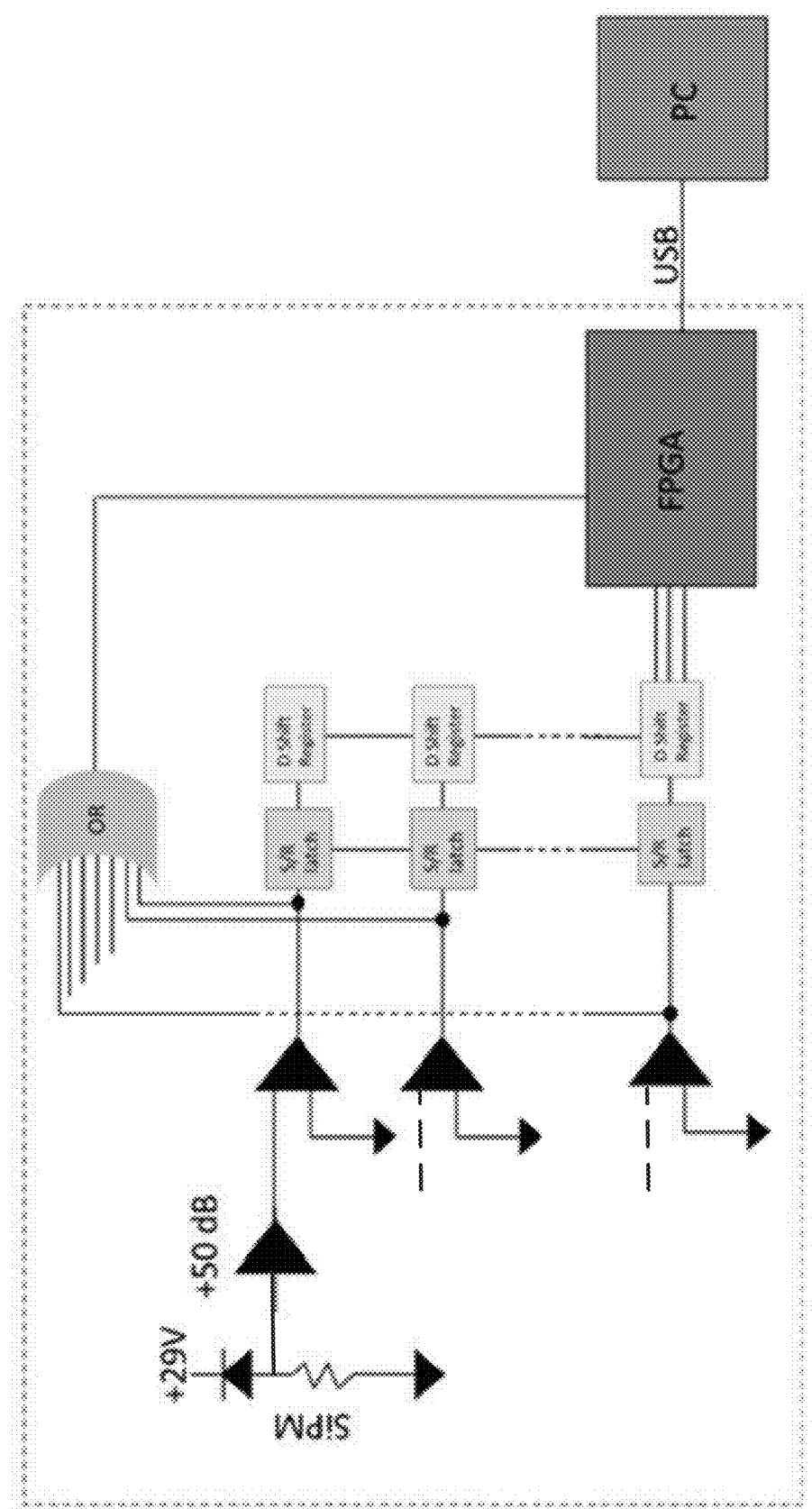
FIG. 19 illustrates an exemplary schematic for the electron tracking system.

FIG. 19 shows the exemplary schematic for the tracking system (minus the scintillating fiber). Readout from each channel can be achieved with a simple comparator circuit. As an electron moves through the exemplary 8 total layers of x and y detectors, the fibers will respond to the hits by producing light pulses, which in turn are converted into electrical current by the SiPMs. Each current pulse drives the voltage at the comparator over a threshold, which subsequently produces a digital output. The processing algorithm looks for the fibers the particle has traversed and the incoming and outgoing tracks can be calculated.

A challenge of the exemplary detector is signal to noise ratio (SNR) in the fiber/SiPM system. The number of photons produced in a 1 mm fiber, by a near relativistic electron, is relatively small and on par with the signal level of the dark current events in the SiPM, e.g., the SNR can be about 1. In one embodiment, requiring coincidence between tracking layers can eliminate many false hits, thus reducing the required SNR. Additionally, the low SNR can be mitigated from two approaches: lower the noise and increase the signal. It is possible to achieve the first through simple cooling of the SiPM sensor. The signal can also be increased with two measures. Improved optical claddings are being implemented by fiber manufacturers, with consequent benefits to photon efficiency. Other optical means can also nearly double light collection efficiency. In one embodiment, these measures can increase SNR to at least 3-4, and when combined with coincidence tracking in the fitting algorithm, can be sufficient to eliminate all or most of the erroneous dark events from the measurement.

In FIG. 1, an outgoing particle detection system 110 can measure the deflection (scattering) and absorption (stopping) of electrons in an item under inspection, such as a smartphone or a tablet computer. In some embodiments, above the outgoing particle detection system 110 there may also be a calorimeter 111 that may measure the energy of electron that exit the volume of interest or item. Both the outgoing particle detection system 110 and the calorimeter 111 can provide data related to the charged particles' interaction with the outgoing particle detection system 110 and the calorimeter 111 to an image processing module 112 located in the computer 114. A calorimeter 111 may be located above the outgoing particle detection system 110, and the calorimeter 111 can provide data related to energy of the charged particles that exit the item that is scanned to the image processing module 112 of the computer 114. The image processing module 112 can determine energy loss of the charged particles by subtracting the energy of the charged particles that exit the item from the pre-determined energy of the charged particles generated by the charged particle source 102.

The image processing module 112 can combine electron scattering/stopping with energy loss to construct images of the item under inspection and its contents. The combined data approach can allow the image processing module 112 to measure density and atomic number of materials within the test item, where Z may represent the average atomic number of the materials in a given volume. This approach can improve the ability of the exemplary PES to classify materials in a manner less dependent on the physical way in which the material is packed. A display 116 connected to a computer 114 can show spatial maps of the effective density of material and the effective atomic number. The display 116 can be a touch screen display. In another exemplary embodiment, the PES 100 can also include an incoming particle detection system 107 located between the beam shaping and steering system 106 (or vacuum chamber) and the target object holding and motion control platform 108. The incoming particle detection system 107 can also provide data related to the charged particles interacting with the incoming particle detection system 107 to the image processing module 112.

A beam shaping and steering system 106 can raster the beam across an object to be scanned in a one-dimensional line over a range of entry angles. A target object-holding and motion-control platform 108, such as a conveyor belt, can move the item through the scan line region. The outgoing particle detection system 110 can measure the position and direction of exiting electrons (or other charged particles) to determine the electron scattering on the path through the item being scanned.

As the charged particles, such as electrons, travel through an item located in the PES, their trajectories are altered due to the interaction with the matter in an item. A high energy electron in PES may undergo multiple Coulomb scatterings while traversing the item, the aggregate scattering angle is a function of the density and atomic number, Z, of the materials inside the item.

In an exemplary embodiment, an aggregate scattering angle of an electron can be calculated by the image processing module 112 by measuring the trajectory of the electron before it enters and after it travels through a volume of interest by using data provided by the incoming and outgoing particle detection systems 107 and 110. By accumulating multiple particle tracks from measurement of trajectories of electrons before and after the electrons travel through a volume of interest, it is possible to build a 3D image of the volume under test with a reconstruction algorithm. In an exemplary embodiment, the incoming particle detection system 107 can determine the trajectory of the electron, before it travels through a volume of interest. In another exemplary embodiment, the outgoing particle detection system 110 can determine the trajectory of the electron, after it travels through a volume of interest, eliminating the need for a tracking detector to measure the electron trajectory prior to entering the inspection volume. In some embodiments, the particle tracking system may include both the incoming and the outgoing particle detection systems.

Figure 20:
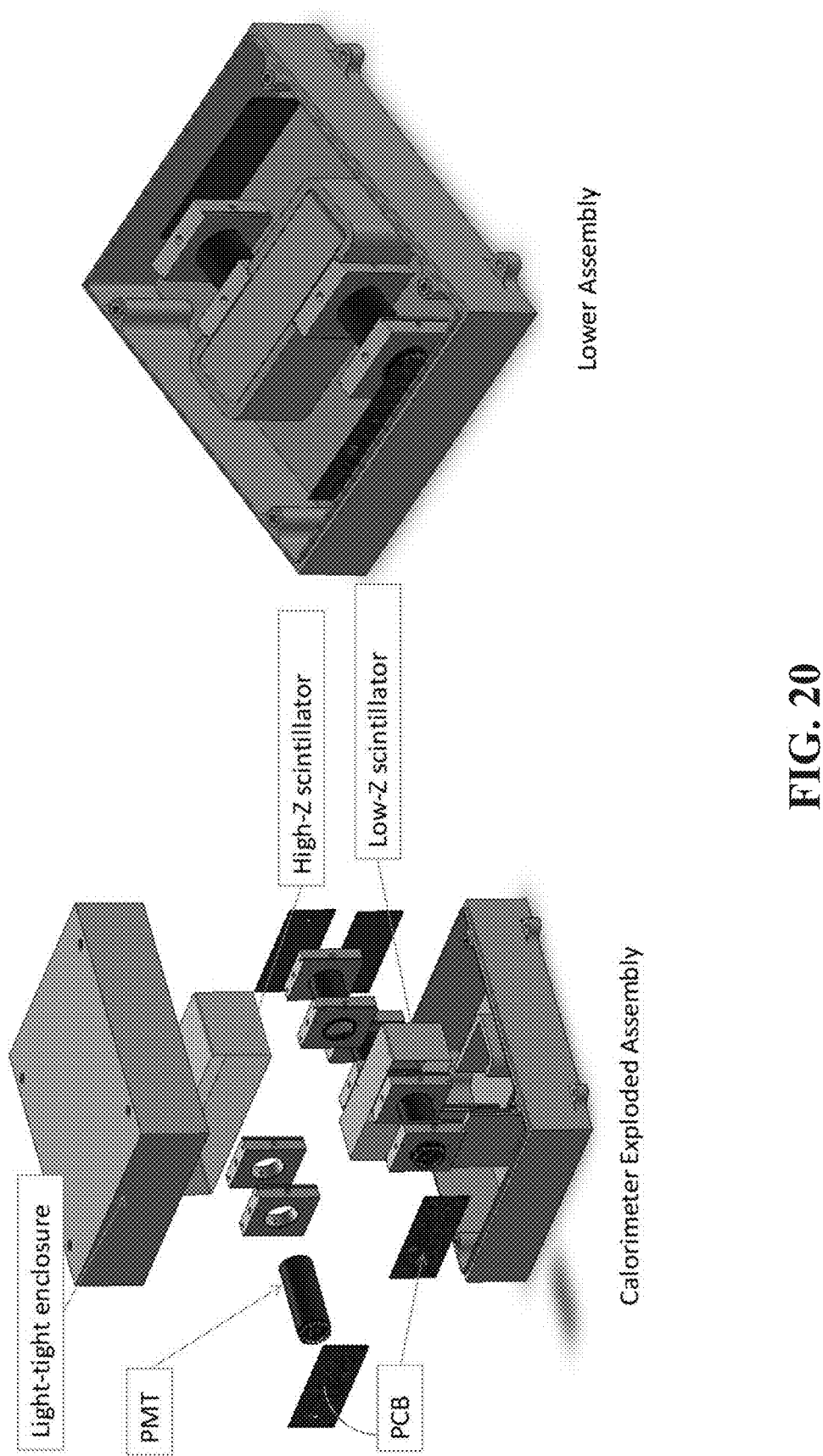
FIG. 20 illustrates an exemplary stop calorimeter including high-z and low-z scintillators in a light tight box with two photomultiplier tubes per scintillator.

FIG. 20 shows an exemplary calorimeter. A calorimeter can measure the energy of the exiting electrons, which in turn will be used to determine the energy lost by the electron as it traversed the object being scanned. In an exemplary embodiment, a low-z scintillator can be a plastic scintillator. In an exemplary embodiment, the high-z scintillator can be lead tungstate ($PbWO_4$). The two scintillators can be encased in a light-tight box, with an opaque entry window. Each scintillator block can have a photomultiplier tube on two opposing ends. The total photon flux for each measured electron can be integrated across both scintillators. In another exemplary embodiment, a low-Z organic scintillator, such as single-crystal stilbene, can be sized to completely stop the incident electrons. A high-Z, fast inorganic scintillator such as single-crystal lead tungstate ($PbWO_4$) can then act as a backstop to capture most of the X-rays generated.

In an exemplary embodiment, after the electrons pass through the incoming and/or outgoing particle detection systems 107 and 110 they enter the calorimeter, which absorbs and measures the energy of the outgoing electrons. This provides complementary information to the electron-scatter signal. One of the benefits of the calorimeter is that the energy absorbed by the calorimeter reduces the radiation shielding requirements.

As a charged particle travels through matter, it loses energy predominately by interaction with the atomic electrons within the material. This energy loss is approximately proportional simply to the effective thickness of electron cloud traversed through the material. Because the charge of these atomic electrons is balanced by an equal number of protons in the atomic nuclei, and because in most cases the number of protons in an atomic nucleus is approximately equal to the number of neutrons the thickness of electron cloud traversed is roughly proportional to the mass density of material traversed. Hydrogen atoms are the exception to this, as they do not have a neutron in the nucleus. They will therefore have twice the number of electrons per unit mass.

The exemplary microtron accelerator provides electrons with a small energy spread centered around a known or pre-determined energy. By using the outgoing particle detection system, the energy of the electrons is measured once they have exited the object under test the material density traversed by those electrons can be estimated. This is complementary to the scattering signal which increases with both the density of the material traversed and the average atomic number of the atoms within this material. In other words, energy loss is proportional to density while scattering is proportional to both density and atomic number. Therefore, energy loss provides complementary information to scattering.

As electrons traverse a material some of the electron's kinetic energy will be converted to bremsstrahlung X-ray photons. These photons are more penetrating and harder to stop than the electrons, and represent an escape of some fraction of the electron's energy that may be measured. They also increase the amount of shielding required to keep the radiation dose within acceptable levels.

X-ray production can be minimized by stopping the electrons in a low-Z material. In one exemplary embodiment, the calorimeter can be designed with a low-Z scintillating material that can be located in a light box at the electron-entry stage to gently slow down the electrons with minimal generation of hard-to-stop forms of radiation, including bremsstrahlung X-rays and neutrons. This section is sized to bring the electrons completely to rest within this volume. In another exemplary embodiment, a layer of high-Z scintillator can surround the low-Z scintillating material and can be incorporated in the light box. The high-Z scintillator can capture at least some fraction of the X-ray photons produced. In some embodiments, the measured energy in the high-Z layer can be added in to the energy in the low-Z core on an event-by-event basis to reduce the uncertainty in the measured energy of each electron.

The scintillators convert some fraction of the energy deposited within them into optical photons. In the exemplary calorimeter, this light is measured by a pair of optically coupled photomultiplier tubes (PMTs). In another exemplary embodiment, a calorimeter can include more than two optically coupled PMTs. The scintillators can be wrapped in an optical reflecting material to keep as much of the scintillation light captured internally until it can reach the face of one of the PMTs. By measuring the ratio of the light detected between the two PMTs, the approximate position of the energy deposition can be estimated, and a correction factor applied through a lookup table to make the energy response of the scintillator more uniform throughout its volume. In an exemplary embodiment, the PMT is coupled to processing circuitry which can process the output of the PMT to measure the energy.

To scan an item, the item can be imaged in slices, where each slice may be formed by irradiating the item from multiple entry angles along a single-entry line across the item. The multiple angles of electron beam energy can assist with a two-dimensional (2D) reconstruction of density within the slice. Translation of the item through the scan region can build up three-dimensional (3D) reconstruction of the item. In some embodiments, measurement of the scatter angle on each electron trajectory yields an estimate of the density and Z on that path through the item. Measurement of the energy loss yields an estimate of the density along that trajectory. The two measurements of density and Z over multiple trajectories can be combined to separately estimate the average Z and density in a 3D reconstructed voxelized map of the item. A reconstructed map can be shown on a display 116.

Unlike X-ray computed tomography, where the individual measurements are strictly attenuation measurements through the target on a line of sight between the X-ray source and the detector, with the charged-particle. e.g. electron, scattering measurements the path of the particles is not a straight line. The electrons in the beam undergo multiple Coulomb scatterings on their passage through the target and the beam can scatter into a progressively wider cross-sectional profile as it progresses. For at least this reason, the "slice" in the electron system broadens towards the exit position. The image reconstruction can take account of these scattering probabilities in the reconstruction of the 3D volume of the target.

In another exemplary embodiment, the order of the various components of the personal electronic scanner can be reversed so that the beam can enter the beam shaping and steering system 106 from a top portion of the cabinet and the rastered adjusted beam exits above the target object-holding and motion-control platform to scan an object on the target object-holding and motion-control platform and to reach the calorimeter.

Further, in one exemplary embodiment, modeling shows that electrons with energies ranging from 10-50 MeV can provide scattering and attenuation data when aimed through an object under inspection. Scattering and attenuation can be processed to yield and display three-dimensional maps of the effective density of material and the effective atomic number, enabling sensitive material discrimination based on the signature library. Applications to screen other objects may require different mean beam energies. Generally, the thicker the object being screened, the higher the required energy.

In an exemplary embodiment, the object under inspection can traverse the system in 1 mm steps, completing a traverse of 150 mm, for example, in 3 seconds. This is a step rate of 50 Hz in one embodiment. The traversal can be in a direction perpendicular to the image plane. The secondary steering magnet sweeps once through its entire field range to generate all or a plurality of angular offsets in one of these traverse steps, implying a sweep rate of 50 Hz on the secondary steering magnet in one embodiment. The primary steering magnet may sweep at some multiple of that frequency, where the multiplier equals the number of different ray paths one wants through each voxel element in the device under inspection. Approximately 10 different paths should be adequate for a device no more than approximately 10 mm thick, and a voxelization using approximately 1 mm cubes.

FIGS. 3 through 6 show the exemplary beam paths for individual electrons in each beam, and the simulation also models the scattering of each electron as it passes through the simulated smartphone target. Scattering is a random process, and building up an image requires analysis of the paths of many electrons through the target.

In an exemplary embodiment, the system creates a single collimated pencil beam of electrons (or other charged particles) in a particle accelerator; using the primary steering magnet, the incident pencil beam is steered through a range of angles in one dimension, thus creating a rastered fan beam; using the wedge magnets, convening the rastered fan beam into a rastered parallel beam; using secondary steering magnet to steer the rastered parallel beam through a series of illumination angles by stepping the field of the secondary steering magnet. The wedge magnets can be permanent magnets with a high-permeability flux return path to reduce stray fields. Optionally, the wedge magnets can be supplemented by smaller, fine-tuning electromagnets. The secondary steering magnet can be an electromagnet.

In another exemplary embodiment, biasing the rastering of the primary steering magnet can be biased to ensure that the entire or most of object under inspection is illuminated at all or a plurality of angles of incidence.

FIG. 9A shows an overview of the exemplary PES that includes an electron source such as a microtron, and a main cabinet that houses the beam shaping and steering system, a particle tracking system that includes the incoming and the outgoing particle detection systems, an electron calorimeter, an electric/mechanical system for vacuum chamber, single-axis translation such a conveyor, and power/control. The exemplary PES also includes an imaging/decision computer (not shown).

FIG. 9B shows a cut-away view of the exemplary main cabinet, where most of the PES subcomponents can be located. In an exemplary embodiment, the beam shaping and steering system is housed in a vacuum chamber, lower right. The one or more vacuum pumps and magnet power supplies can be mounted lower right. The conveyor belt moves the item under inspection through the electron fan beam and particle tracking system (top-middle, but not shown).

FIG. 9C shows a closer view of the exemplary main cabinet, including a cut away view of the vacuum chamber. The PES can use a rastered, thin fan beam to scan items such as phones. Each item will be loaded onto the conveyor system by the user. Once on the conveyor, the item can be moved through the beam line/detection system and out to the other side. The particle tracking system which includes the first detector (or the incoming particle detection system) below the object under inspection and a second detector (or the outgoing particle detection system) above the object under inspection is shown at top-center, with the object under inspection moving through.

Figure 9D:
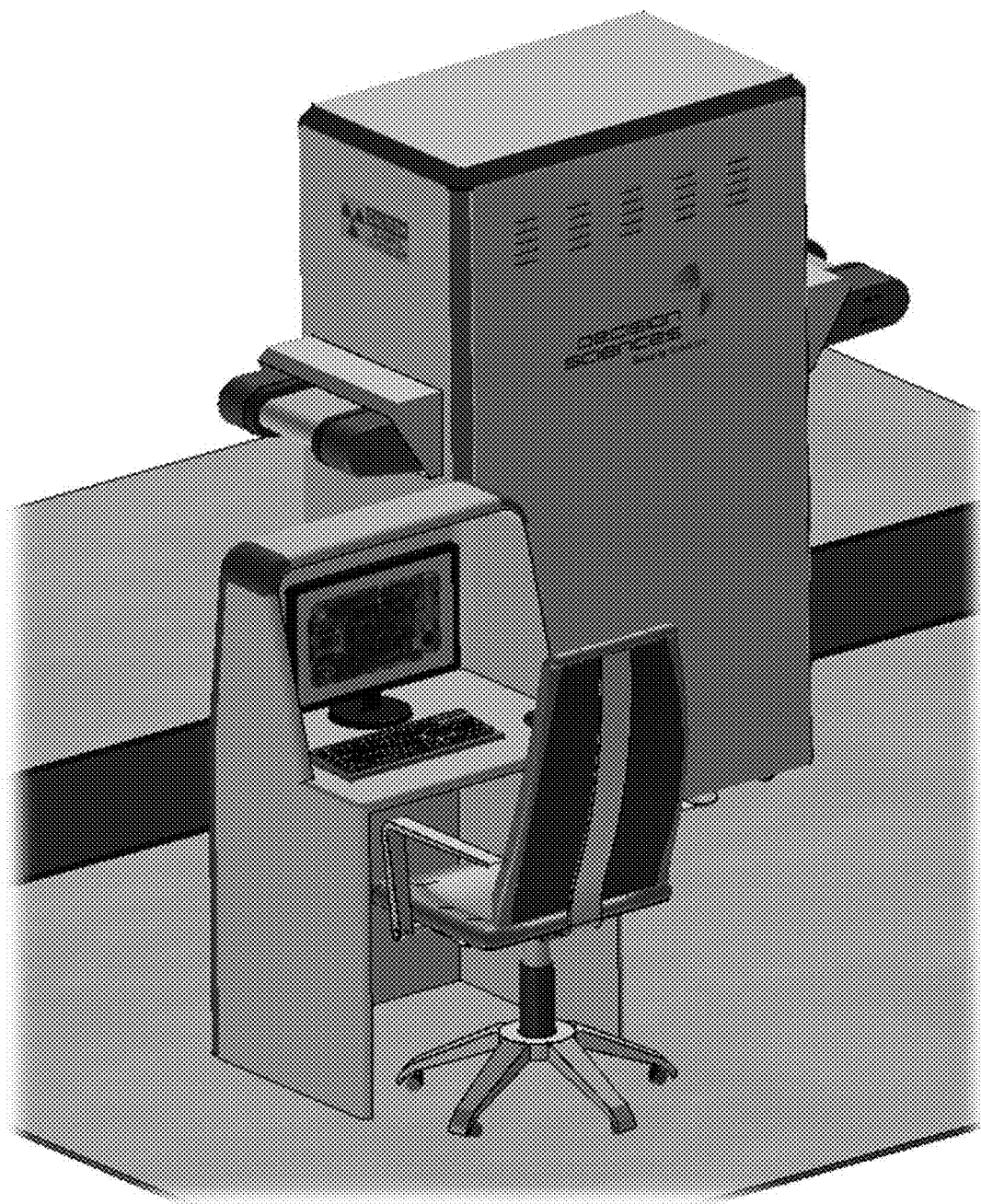
FIGS. 9D-9F illustrates various exemplary embodiments of the Portable-Electronics Scanner (PES).
Figure 9E:
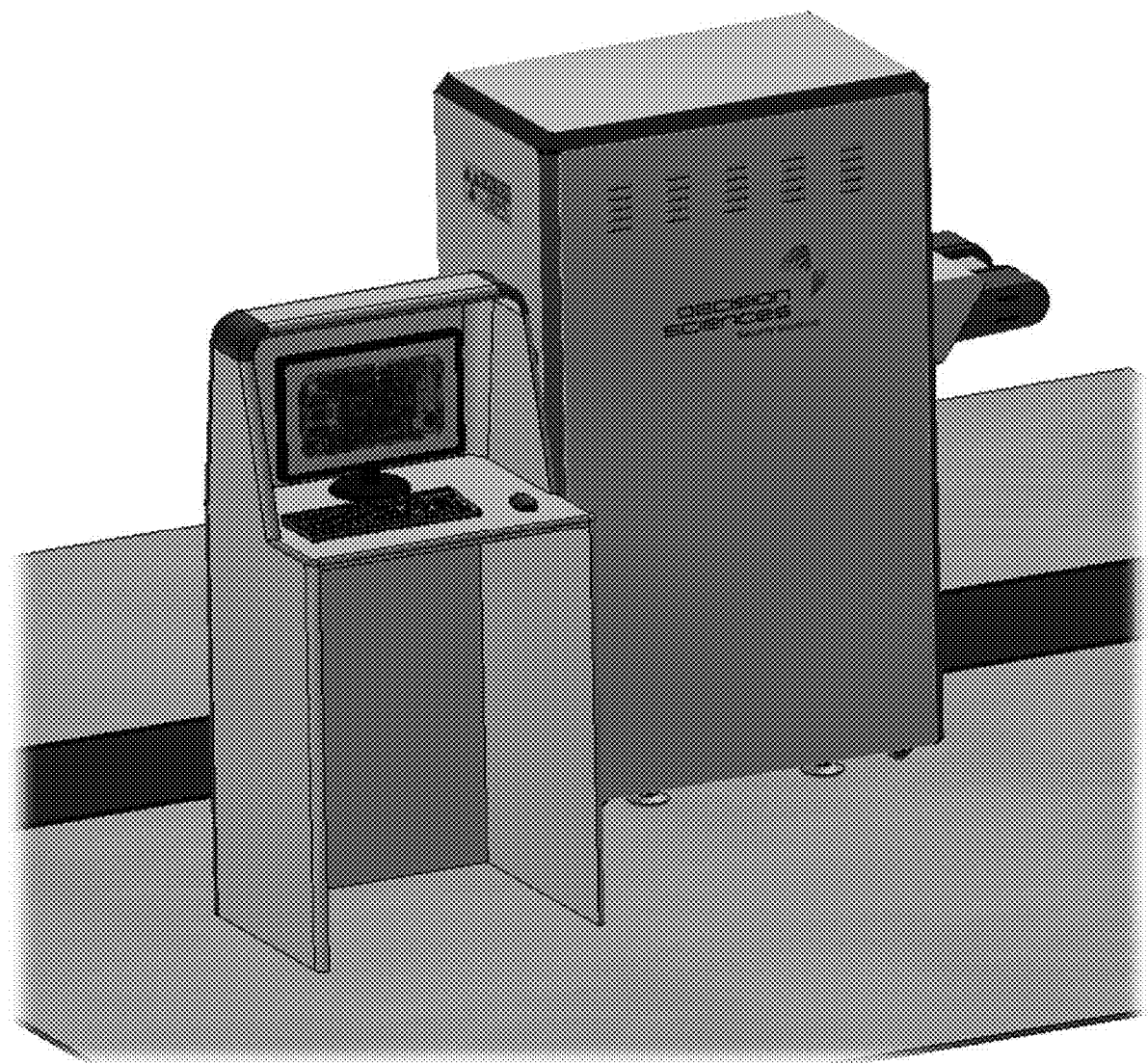
Figure 9F:
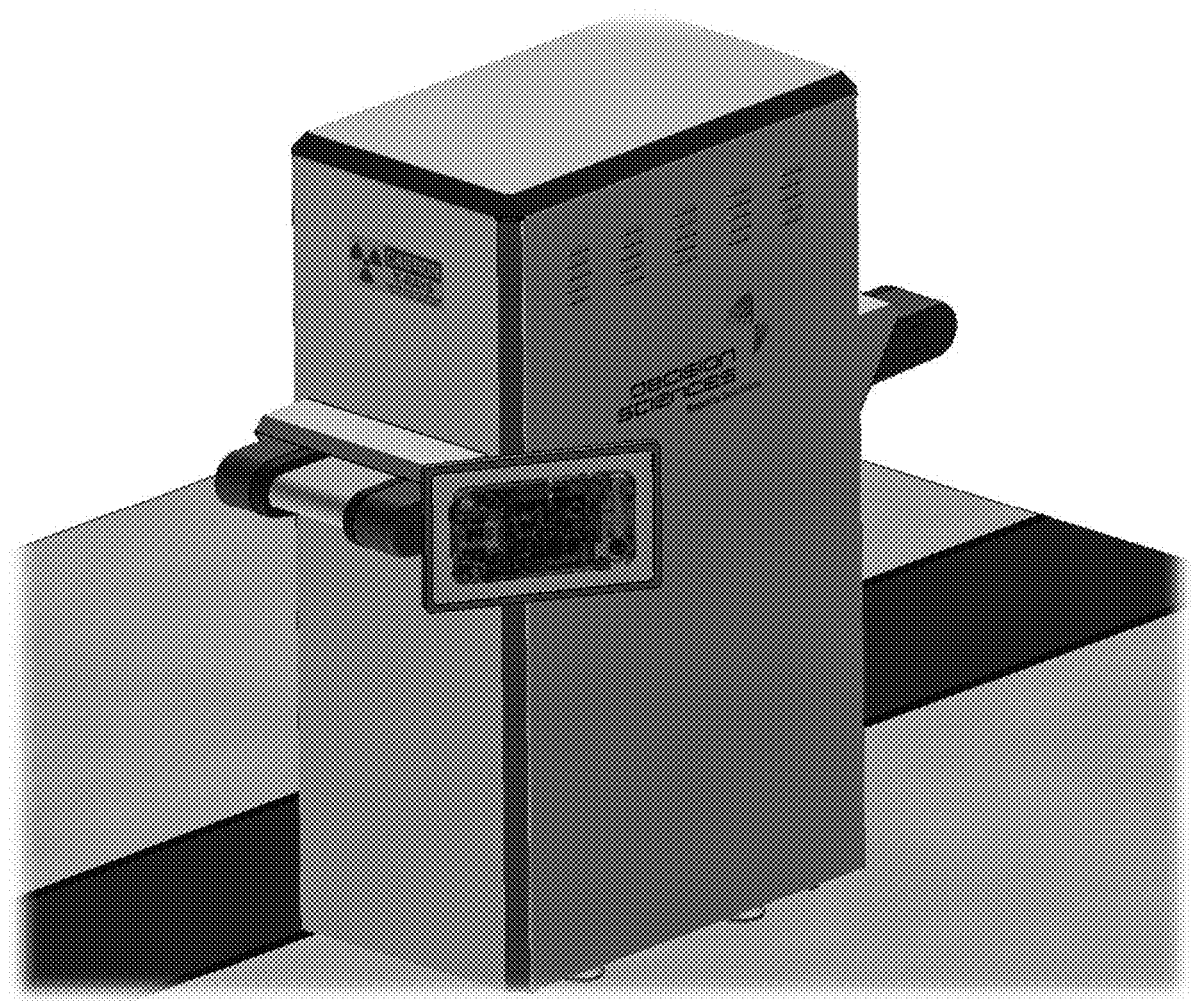

FIGS. 9D-9F show various exemplary embodiments of the Portable-Electronics Scanner (PES). FIG. 9D shows the exemplary PES with a stand-alone sitting computer station. FIG. 9E shows the exemplary PES with a stand-alone standing computer station. FIG. 9F shows the exemplary PES with an attached touch screen monitor on moveable arm.

Charged-particle beam tomography provides better material discrimination compared to X-ray technology. Unlike X-ray technology, electron beam or other charged-particle beam tomography can measure both the material's density and its average atomic number. These two independent parameters enable a more robust material characterization and classification, with a correspondingly smaller percentage of items requiring secondary screening. A benefit of the technology disclosed in this patent document is that it can significantly reduce staffing requirements. Furthermore, in contrast to the moving gantry used in X-ray tomography systems, the exemplary embodiments disclosed herein presents a low-cost means of shaping the electron beam and steering it to provide multiple angles of illumination without the use of moving parts. The absence of moving parts in the charged particle tomography apparatus enormously reduces maintenance and repair expenses, reducing life-cycle costs compared to X-ray tomography.

The charged-particle tomography disclosed in the exemplary embodiments is also contrasted with systems that rely on naturally occurring cosmic radiation for illumination rather than a controlled incident beam. Since cosmic rays arrive from different directions, they effectively provide multiple-angle illumination. However, their flux is far too low for rapid, high-resolution imaging of small objects. Furthermore, the variable trajectories of the incident particles require tracking them as they both enter and exit the volume of interest, increasing the cost of detector arrays. Because the charged particles are scattered as they pass through the volume of interest, their tracks are not straight lines, and processing can estimate the location of their effective scattering points. Thus, in principle, a single illumination direction can itself suffice for 3D imaging—in contrast to X-ray tomography, where the photons travel exclusively in straight lines. However, a single illumination angle will not provide high resolution in the thickness dimension of the object being scanned. The exemplary embodiments disclosed in this patent document solve these shortcomings by providing a cost-effective means to steer the incident beam and provide multiple illumination angles.

Figure 22:
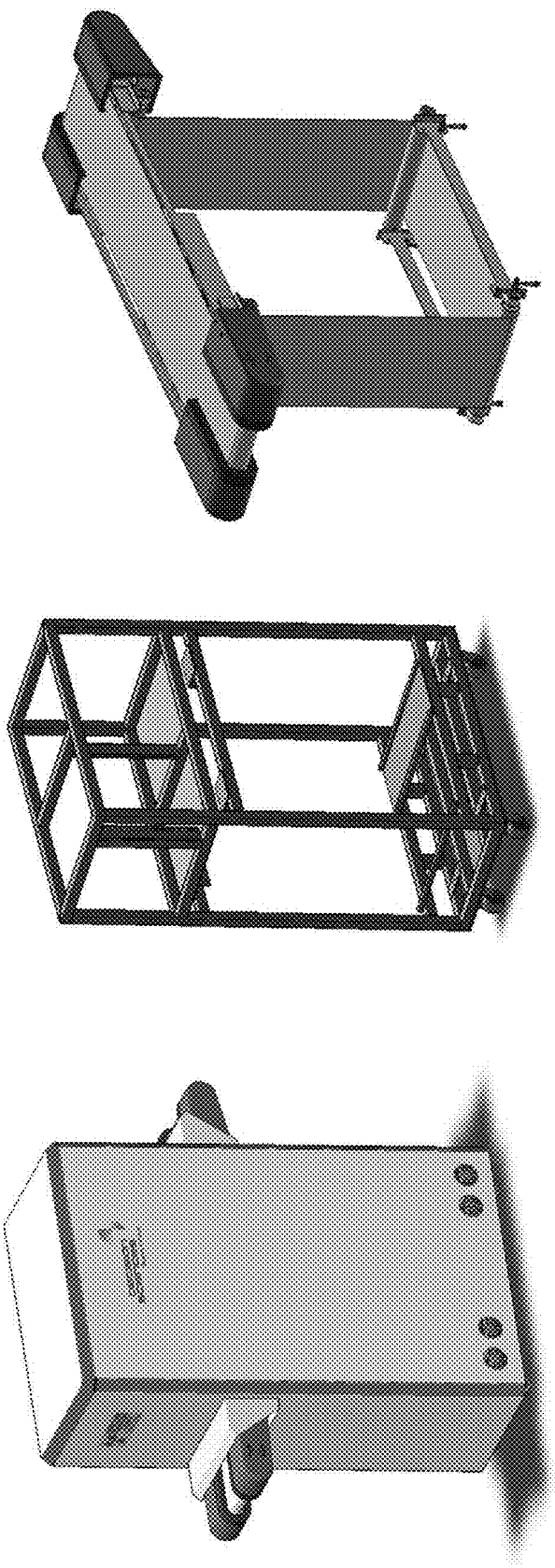
FIG. 22 illustrates the remaining exemplary components of the electronics cabinet.

FIG. 22 shows the remaining exemplary components of the electronics cabinet (vacuum pump(s), magnets, and power supplies). The frame can be 1.5" square tubing made of welded steel. The conveyor system can be a 2.5" diameter powered roller, which can move a 0.09" thick belt up to 33 ft/min. One approach is to have the conveyor moving continuously. Items, such as phones, are dropped in place and can move through the system at a constant rate.

It may also be desirable to move the item under inspection more dynamically through the system. On entry the item might move slowly through a positioning system (e.g., bumpers) that center the phone in the scan volume. On exit, the PES might sequester the phone until processing is finished—allowing operators to easily confiscate or further interrogate the phone. Delay on exit would also allow an option to re-scan; run the device back through the scan volume in cases of system error or the need for further investigation.

Figure 23:
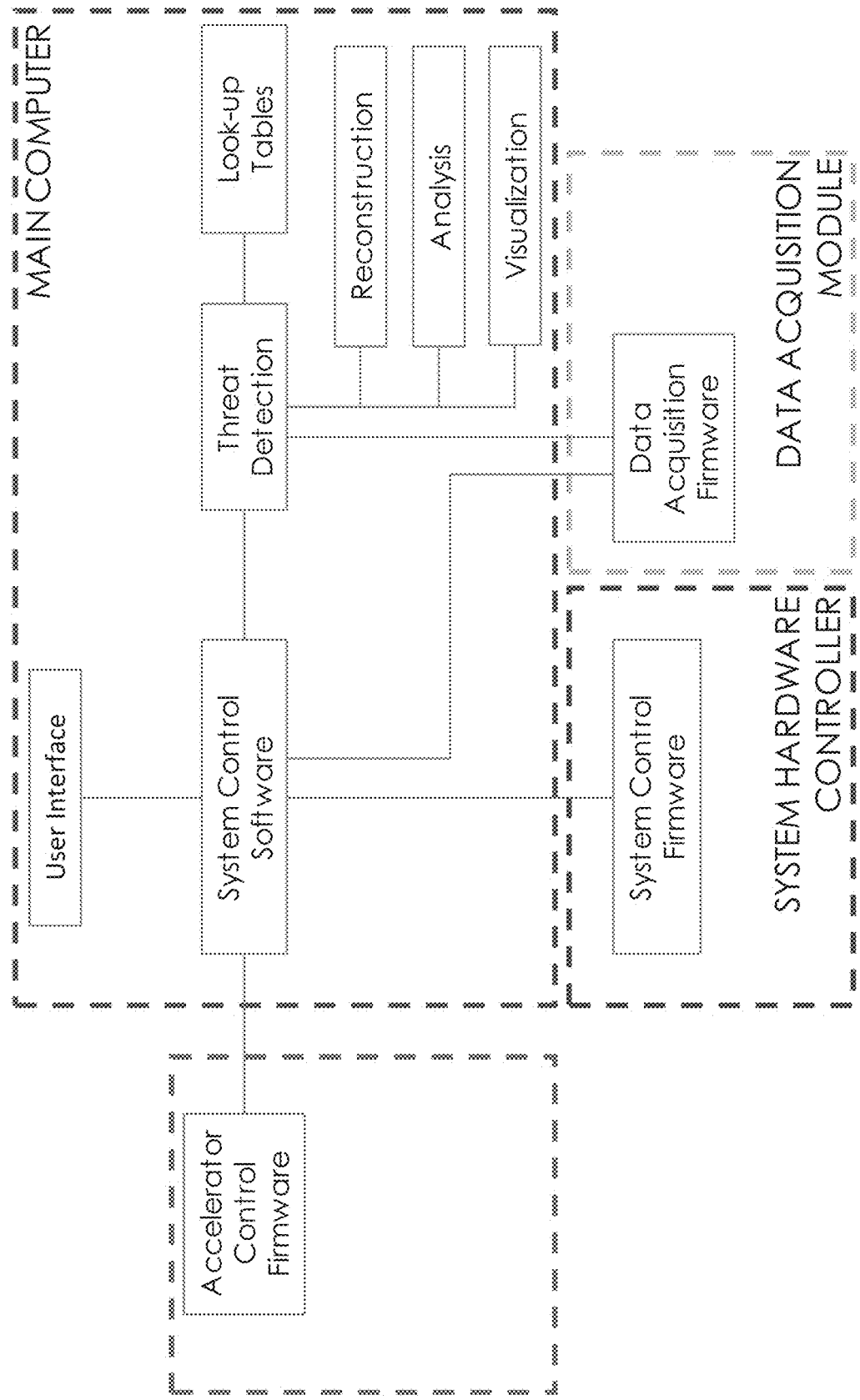
FIG. 23 illustrates exemplary software architecture for the Portable-Electronics Scanner (PES).
Figure 24:
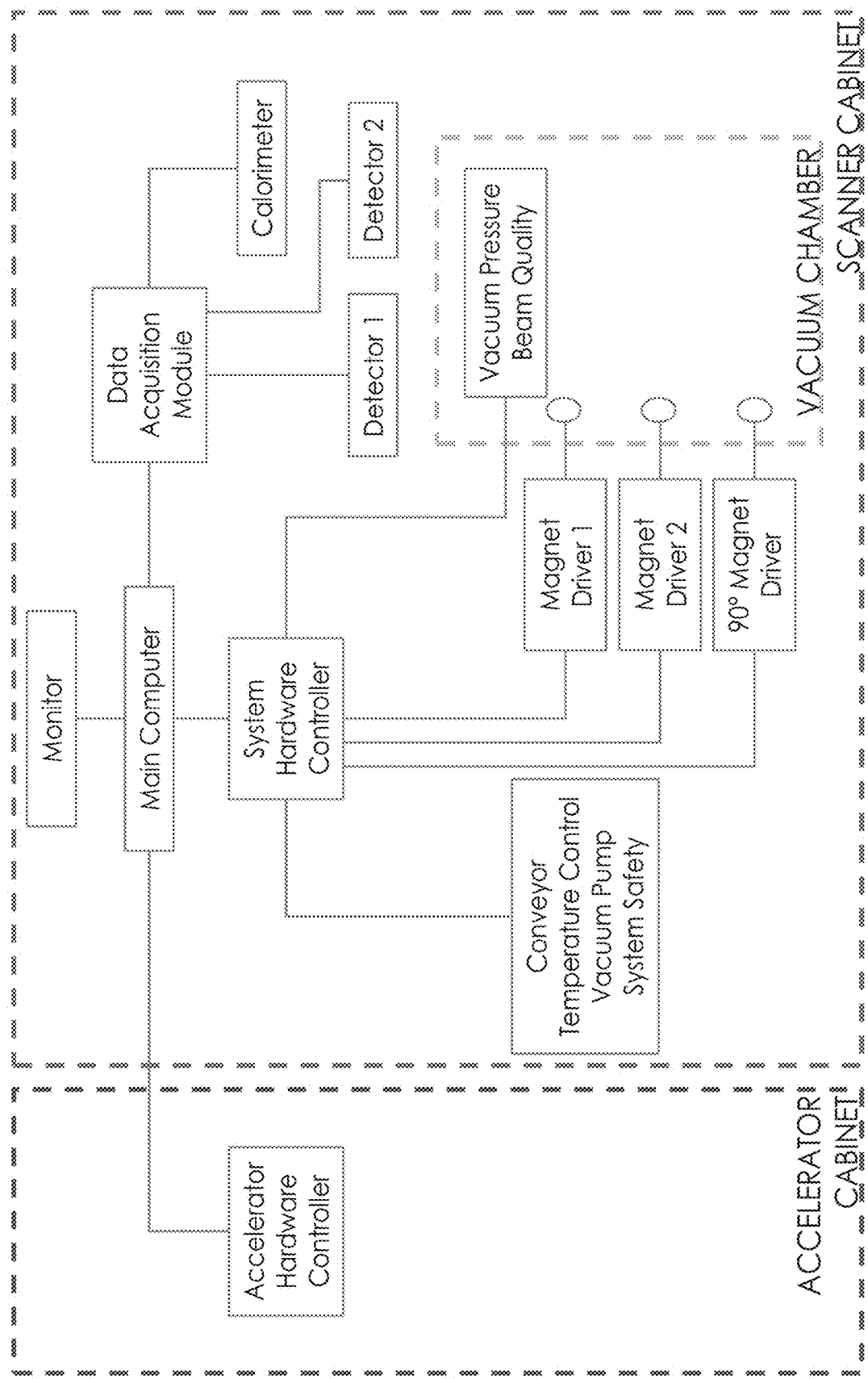
FIG. 24 illustrates an exemplary system diagram of the Portable-Electronics Scanner (PES).

In FIG. 1, the PES includes a computer 114 that can run the exemplary software based on the exemplary algorithms and methods. FIGS. 23-24 shows the exemplary software architecture and block diagram for the PES. The main computer may need to manage the operation of the accelerator, the beam shaping system, and possibly the conveyor belt if a dynamic transit mode is used. It can also handle the data stream from the tracking system, and perform imaging reconstruction and analysis.

The exemplary PES throughput specification can be 120 scans per hour. That allows about 30 s per phone. Placement and transit of the phone will likely take 3-5 s (or 3-5 seconds). The active scan time can be 3 s. That leaves a budget of ~20 s for processing and exit transport that can occur simultaneously.

The data can contain tracks for approximately 10 million electrons. The primary reconstruction algorithm can be based on a maximum likelihood expectation maximization (MLEM) method. The reconstruction algorithm can provide a quantitative measure of material density and atomic number, by virtue of taking into account not just the aggregate scattering angle of a track, but also its lateral displacement.

An MLEM reconstruction can be implemented with GPU-based code. A single iteration of the algorithm, for a data set of this size, can execute in approximately 0.8 s. Five iterations should be sufficient to make an actionable image of the phone, which would consume 4 s of time.

With 3 s active scan time, and 4 s processing time, there can be ample time left for longer scans, more iterations in the MLEM reconstruction, and/or rescanning the phone. There is also time to execute other image reconstruction algorithms that might yield improved detection capabilities.

Reconstruction time will likely be shortened by advances in computing and GPUs. Multiple computers/GPUs could also be run in parallel to further speed the processing. It may also be desirable to include other processing algorithms in the PES analysis package.

While many algorithms are not as quantitative as MLEM, some show promise for greater contrast between area of threat and areas of non-threat. Threat detection using image-based detection is theoretically not as desirable as the absolute quantitation method, but can be practical to achieve the PES purpose of reliable threat detection.

In an exemplary embodiment, the threat detection can distinguish phone batteries from threat objects, which can be very close in density but have different average atomic numbers, or vice-versa. The calorimeter and combined scatter/energy loss algorithms dramatically improve material discrimination over the use of either independently.

In an exemplary embodiment, differentiating threats from normal phones can be aided by building a look up table of known phone models. As the system scans a phone, it can look for characteristic markers which match previously scanned phones. As a particular object is scanned, over and over, its look-up table (LUT) entry can be refined over time. For example, if the scanned object is a phone that matches characteristics of a phone from the LUT, but has marked differences, that may indicate the potential of a threat. In addition, as new personal electronics models are released, and scanned by the system, the LUT will expand its library.

Figure 25:
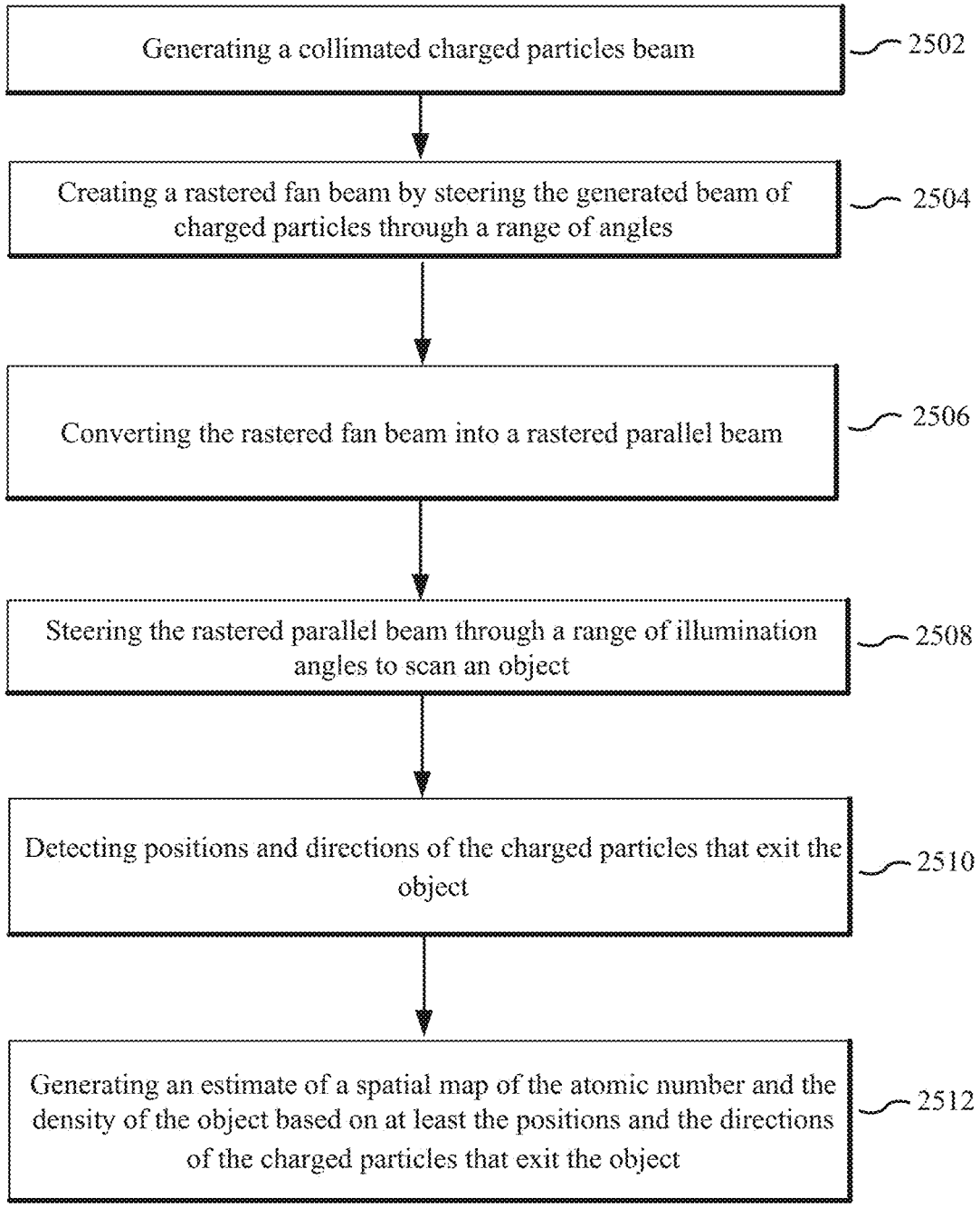
FIG. 25 shows an example flowchart of a method of operating a scanner for interrogating contents of a volume.

FIG. 25 shows an example flowchart of a method of operating a scanner for interrogating contents of a volume. Operation 2502 includes generating a collimated charged particles beam. Operation 2504 includes creating a rastered fan beam by steering the generated beam of charged particles through a range of angles. Operation 2506 includes converting the rastered fan beam into a rastered parallel beam. Operation 2508 includes steering the rastered parallel beam through a range of illumination angles to scan an object. Operation 2510 includes detecting positions and directions of the charged particles that exit the object. Operation 2512 includes generating an estimate of a spatial map of the atomic number and the density of the object based on at least the positions and the directions of the charged particles that exit the object, where the spatial map can be displayed on a display.

In some embodiments, the method further includes moving an object to be scanned through the range of illumination angles of the steered rastered parallel beam. In some embodiments, determining scatter angles of the charged particles using at least the positions and the directions of the charged particles that exit the object, wherein the atomic number and the density of the object are proportional to the scatter angles.

In some embodiments, the method further includes detecting positions and directions of the charged particles beam before the charged particles beam enter the object, wherein the scatter angles are determined based on the positions of the charged particles beam before the charged particles beam enter the object and based on the positions of the charged particles that exit the object. In some embodiments, the method further includes measuring energy of the charged particles that exit the object; determining energy loss of the charged particles based on the measured energy and an energy of the charged particles beam that enter the object; and determining an estimate of the density of a part of the object along a path of the charged particles beam based on the energy loss, wherein the density of the part of the object is proportional to the energy loss.

In this patent document, the word "exemplary" is used to mean serving as an example, instance, or illustration. Any embodiment or design described herein as "exemplary" is not necessarily to be construed as preferred or advantageous over other embodiments or systems. Rather, use of the word exemplary is intended to present concepts in a concrete manner.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question. e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of operating a scanner for interrogating contents of a volume, the method comprising:
   generating a collimated beam of charged particles;
   creating a rastered fan beam by steering the generated beam of charged particles through a range of angles;
   converting the rastered fan beam into a rastered parallel beam;
   steering the rastered parallel beam through a range of illumination angles to scan an object;
   detecting positions and directions of the charged particles that exit the object; and
   generating an estimate of a spatial map of atomic number and density of the object based on at least the positions and the directions of the charged particles that exit the object.

2. The method of claim 1, further comprising:
   moving an object to be scanned through the range of illumination angles of the steered rastered parallel beam.

3. The method of claim 1, further comprising:
   determining scatter angles of the charged particles using at least the positions and the directions of the charged particles that exit the object, wherein the atomic number and the density of the object are proportional to the scatter angles.

4. The method of claim 3, further comprising:
   detecting positions and directions of the charged particles beam before the charged particles beam enter the object, wherein the scatter angles are determined based on the positions of the charged particles beam before the charged particles beam enter the object and based on the positions of the charged particles that exit the object.

5. The method of claim 1, further comprising:
   measuring energy of the charged particles that exit the object; and
   determining energy loss of the charged particles based on the measured energy and an energy of the charged particles beam that enter the object.

6. The method of claim 5, further comprising:
   determining an estimate of the density of a part of the object along a path of the charged particles beam based on the energy loss, wherein the density of the part of the object is proportional to the energy loss.

7. The method of claim 1, wherein the generated beam of charged particles is steered through the range of angles in one dimension.

8. The method of claim 1, wherein the rastered fan beam having an angular deflection is converted into the rastered parallel beam by applying magnetic fields that causes the rastered fan beam to bend to the rastered parallel beam.

9. The method of claim 8, wherein the magnetic fields have opposite polarities.

10. The method of claim 1, wherein the rastered fan beam is created by sweeping a first magnetic field of a first magnet over a first range of magnetic fields.

11. The method of claim 1, wherein the rastered parallel beam is steered by sweeping a second magnetic field of a second magnet over a second range of magnetic fields.

12. The method of claim 1, wherein the steering of the rastered parallel beam adjusts entry angles of the charged particles.

13. The method of claim 1, wherein the range of illumination angles to scan the object are selectable.

14. The method of claim 1, wherein the creating the rastered fan beam, the converting the rastered fan beam into the rastered parallel beam, and the steering the rastered parallel beam is performed in an area where a vacuum is maintained or applied.

15. The method of claim 1, wherein after the collimated charged particles beam is generated and before the rastered fan beam is created the method further comprises:
   receiving the collimated charged particles beam in a first orientation; and
   changing an orientation of the collimated charged particles beam from the first orientation to a second orientation, wherein the rastered fan beam is created after the orientation of the collimated charged particles beam is in the second orientation.

16. The method of claim 15, wherein the first orientation is perpendicular to the second orientation.

17. The method of claim 1, wherein the collimated charged particles beam is generated having a pre-determined energy.

18. The method of claim 1, wherein the spatial map of the atomic number and the density of the object are displayed.

* * * * *